US011318007B2

(12) United States Patent
Szeliga

(10) Patent No.: US 11,318,007 B2
(45) Date of Patent: May 3, 2022

(54) ANIMAL INCISION COVER

(71) Applicant: Marek Szeliga, Mississauga (CA)

(72) Inventor: Marek Szeliga, Mississauga (CA)

( * ) Notice: Subject to any disclaimer, the term of this patent is extended or adjusted under 35 U.S.C. 154(b) by 590 days.

(21) Appl. No.: 16/501,202

(22) Filed: Mar. 6, 2019

(65) Prior Publication Data
US 2019/0274284 A1    Sep. 12, 2019

Related U.S. Application Data

(60) Provisional application No. 62/710,951, filed on Mar. 6, 2018.

(51) Int. Cl.
*A61D 9/00*    (2006.01)

(52) U.S. Cl.
CPC ........................ *A61D 9/00* (2013.01)

(58) Field of Classification Search
CPC ................... A61D 9/00; A01K 13/006
See application file for complete search history.

(56) References Cited

U.S. PATENT DOCUMENTS

| | | | | |
|---|---|---|---|---|
| 3,141,443 A | * | 7/1964 | Huey ..................... | A01K 23/00 119/854 |
| 3,895,628 A | * | 7/1975 | Adair ...................... | A61D 9/00 602/79 |
| 4,355,600 A | * | 10/1982 | Zielinski ................. | A61D 9/00 119/850 |
| 6,024,055 A | * | 2/2000 | Jesse, Sr. ............. | A01K 13/006 119/850 |
| 6,070,557 A | * | 6/2000 | Hibbert ................ | A01K 13/006 119/850 |
| 6,234,117 B1 | * | 5/2001 | Spatt .................... | A01K 13/006 119/850 |
| 6,267,083 B1 | * | 7/2001 | Chimienti ............ | A01K 13/006 119/850 |
| 6,484,321 B1 | * | 11/2002 | Shamam ............ | A41D 13/1245 2/114 |

(Continued)

FOREIGN PATENT DOCUMENTS

| | | | | |
|---|---|---|---|---|
| JP | 2009159917 A | * | 7/2009 | ............... A61D 9/00 |
| WO | WO-9955145 A1 | * | 11/1999 | ............ A01K 13/006 |
| WO | WO-03086500 A2 | * | 10/2003 | ............... A61F 7/02 |

*Primary Examiner* — Magdalena Topolski
*Assistant Examiner* — Edgar Reyes
(74) *Attorney, Agent, or Firm* — Karceski IP Law, PLLC

(57) ABSTRACT

A reversible wearable animal incision cover that may be used on both male and female dogs to cover incisions typical in the neutering of male and female dogs having a first end for covering the incisions caused by the neutering of a female dog and having an opposing second end for covering the incisions caused by the neutering of a male dog. By longitudinally reversing the cover along the length of the dog a single wearable animal incision cover may be used on both male and female dogs. A male rear body covering portion may comprise a drawstring disposed through a drawstring channel along a rear edge of the web for drawing the male rear body covering portion upwardly against the rear of a male dog and drawing the rear side edges of the web towards each other. The bottom of the web may comprise a selection area substantially along the longitudinal axis of the web, the selection area comprising a plurality of longitudinally arranged openable penis apertures separated by reinforcements.

14 Claims, 23 Drawing Sheets

(56) References Cited

U.S. PATENT DOCUMENTS

| | | | | |
|---|---|---|---|---|
| D615,711 S * | 5/2010 | Van Sice | ...................... | D30/145 |
| 8,707,910 B1 * | 4/2014 | Koll | ...................... | A01K 13/006 |
| | | | | 119/850 |
| 8,863,699 B2 * | 10/2014 | Bishop | ................. | A01K 13/006 |
| | | | | 119/850 |
| 8,985,062 B1 * | 3/2015 | Syberg | .................... | A61D 9/00 |
| | | | | 119/850 |
| 9,072,278 B2 * | 7/2015 | Chortyk-White | .... | A01K 13/006 |
| 9,258,981 B2 * | 2/2016 | Bragion | ................... | A61D 9/00 |
| D802,855 S * | 11/2017 | Pegago | ................ | A01K 13/006 |
| | | | | D30/145 |
| 10,856,529 B2 * | 12/2020 | Harris | .................... | A01K 19/00 |
| 2005/0283103 A1 * | 12/2005 | Murfett | ................ | A01K 13/006 |
| | | | | 119/850 |
| 2007/0056530 A1 * | 3/2007 | Nassour | ............... | A01K 13/006 |
| | | | | 119/850 |
| 2009/0183692 A1 * | 7/2009 | Rossi | ...................... | A61D 9/00 |
| | | | | 119/850 |
| 2012/0174875 A1 * | 7/2012 | Wetzel | ................... | A01K 21/00 |
| | | | | 119/838 |
| 2012/0174877 A1 * | 7/2012 | Thompson | ............... | A61D 9/00 |
| | | | | 119/850 |
| 2012/0199082 A1 * | 8/2012 | Dick | ....................... | A61D 9/00 |
| | | | | 119/850 |
| 2016/0044895 A1 * | 2/2016 | Schnieder | ............ | A01K 13/006 |
| | | | | 119/850 |
| 2017/0290293 A1 * | 10/2017 | Spanovic | ............. | A01K 13/006 |

\* cited by examiner

ANIMAL INCISION COVER

FIELD OF THE INVENTION

This invention relates to wearable animal incision covers, and in particular wearable animal incision covers for covering incisions caused by the neutering of male and female dogs.

BACKGROUND OF THE INVENTION

When a dog undergoes surgery one (1) or more incisions are usually made which are sutured or stitched up when the operation is completed. It is important that these stitches are not prematurely removed or ripped open while the wound is healing, whether by biting, scratching or even constant licking, which becomes even more critical when self-dissolving stitches are used. As a result wearable post surgery coverings for dogs have been developed, typically comprising a web covering the bottom of a dog and having four (4) woven apertures for the dogs's legs, the sides of which extend upwardly over the sides of the dog, the sides of which may be held together by a plurality of opposing ties, laces or strings.

One of the most common procedures performed on dogs is neutering (which in this specification includes castration of male dogs and spaying of female dogs) which involves one or more incision(s) to remove, or render nonfunctional, the reproductive genital organs of both male and female dogs. As male and female dogs both defecate through an anus located underneath a tail the lower web of material when extending upwardly over the rear of the animal ends a sufficient distance below the anus to permit defecation. This is substantially the same for male and female dogs. However, given the location of the female urinary opening in dogs the rearward extension of the web typically defines a valley to prevent the web from the external female genitals used for urination.

By comparison, in male dogs the incision(s) from neutering the male dog typically takes place at the testicles under the anus, and substantially in the location of the external female genitals which typically remain uncovered to permit urination. Accordingly, the rearward extension of the web upwardly for covering the area comprising the testicles, in order to cover the incision(s), is incompatible with a cover for female dogs as that area must be left open for urination.

Accordingly, as the structures of these male and female wearable incision covers are mutually exclusive for male and female dogs, separate wearable animal incision covers have been created for male and female dogs, as practically incision covers for male and female dogs must cover the areas of incision necessary for the most common types of procedures, namely neutering. Accordingly, not only must a veterinarian maintain a number of different sizes of wearable animal incision covers for different sized dogs, but must maintain an inventory of each type for both male and female dogs resulting in significant additional expense and space for inventory. Accordingly, a way to avoid the duplication of separate wearable animal incision covers for male and female dogs is desirable.

With respect to prior art wearable incision covers for male dogs one problem that may present itself is that the rearward extension of the web intended to cover the testicle area may not lie flat and surround the testicle area and incision thereabout potentially causing gaps between the covering and the dog. This condition may be worsened as a result of the typical placement of the most rearwardly set of opposing ties holding opposing edges of the web together over top of the male dog just over or slightly forward of the juncture between the dog's body and tail. This most rearward set of ties may also slip down over the tail of the male dog resulting in even more exposure of the testicle area and may permit at least licking of the incision and its suturing. Accordingly, a way of tying the sides of the web together without permitting significant gaps between the web and the rear of the dog, and in particular the testicle area of the dog, is desirable.

With respect to prior art wearable incision covers for male dogs typical prior art wearable incision covers have a pre-placed aperture through which the penis of a male dog is to extend to attempt to prevent the male dog from urinating through the lower portion of the web. However, given that the particular placement of the male genitals may vary somewhat a single permanent placement of such a penis aperture is less than ideal, as the penis may slip back in through the penis aperture allowing the dog to urinate through and into the inside of the bottom of the web. Accordingly, a way of selecting other locations for a penis aperture, while maintaining the integrity of the web, and without on-site reconstruction by the veterinarian, is desirable.

SUMMARY OF THE INVENTION

In one aspect the invention provides that a reversible wearable animal incision cover that may be used on both male and female dogs to cover incisions typical in the neutering of male and female dogs by adapting a first end of the cover for covering the incisions caused by the neutering of a female dog and by adapting an opposing second end of the cover for covering the incisions caused by the neutering of a male dog. By longitudinally reversing the cover along the length of the dog a single wearable animal incision cover may be used on both male and female dogs.

In another aspect the invention provides a reversible wearable animal incision cover which has at a first end a web to cover the testicles of a male dog, or the area where the testicles of the male dog were previously joined to the dog's body before the testicles were removed, and to cover incisions generated during the neutering of a male dog, and which has at a substantially opposing second end a web to cover incisions generated during the neutering of a female dog and which web does not cover the female genital area necessary to urinate without obstruction by the web.

In another aspect the invention provides a reversible wearable animal incision cover comprising a web having a longitudinal axis for alignment along a bottom of a length of an animal, the web having four leg apertures in the bottom of the web for four legs of the animal. The web has one or more connector for operably connecting opposing sides of the web to draw opposing side edges of the web towards each other over a back of the animal. The web has a first end at an end of the longitudinal axis, the first end comprising a female rear body covering portion for placement over a rear of a female animal, and has a second end at another end of the longitudinal axis, the second end comprising a male rear body covering portion for placement over a rear of a male animal.

In another aspect of the invention the male rear body covering portion further comprises a drawstring disposed through a drawstring channel along a rear edge of the web for drawing the male rear body covering portion upwardly against the rear of a male dog and drawing the rear side edges of the web towards each other.

In another aspect the invention provides a loop forward of the rear edge of the web, each loop for receiving a different end of the drawstring, the ends of the drawstring being configured to be connectable to each other for drawing the male rear body covering portion forwardly and upwardly against the rear of the male animal.

In another aspect of the invention the bottom of the web further comprises a selection area substantially along the longitudinal axis of the web, the selection area comprising a plurality of longitudinally arranged openable penis apertures separated by reinforcements.

DETAILED DESCRIPTION OF PREFERRED EMBODIMENTS OF THE INVENTION

Figure 1:
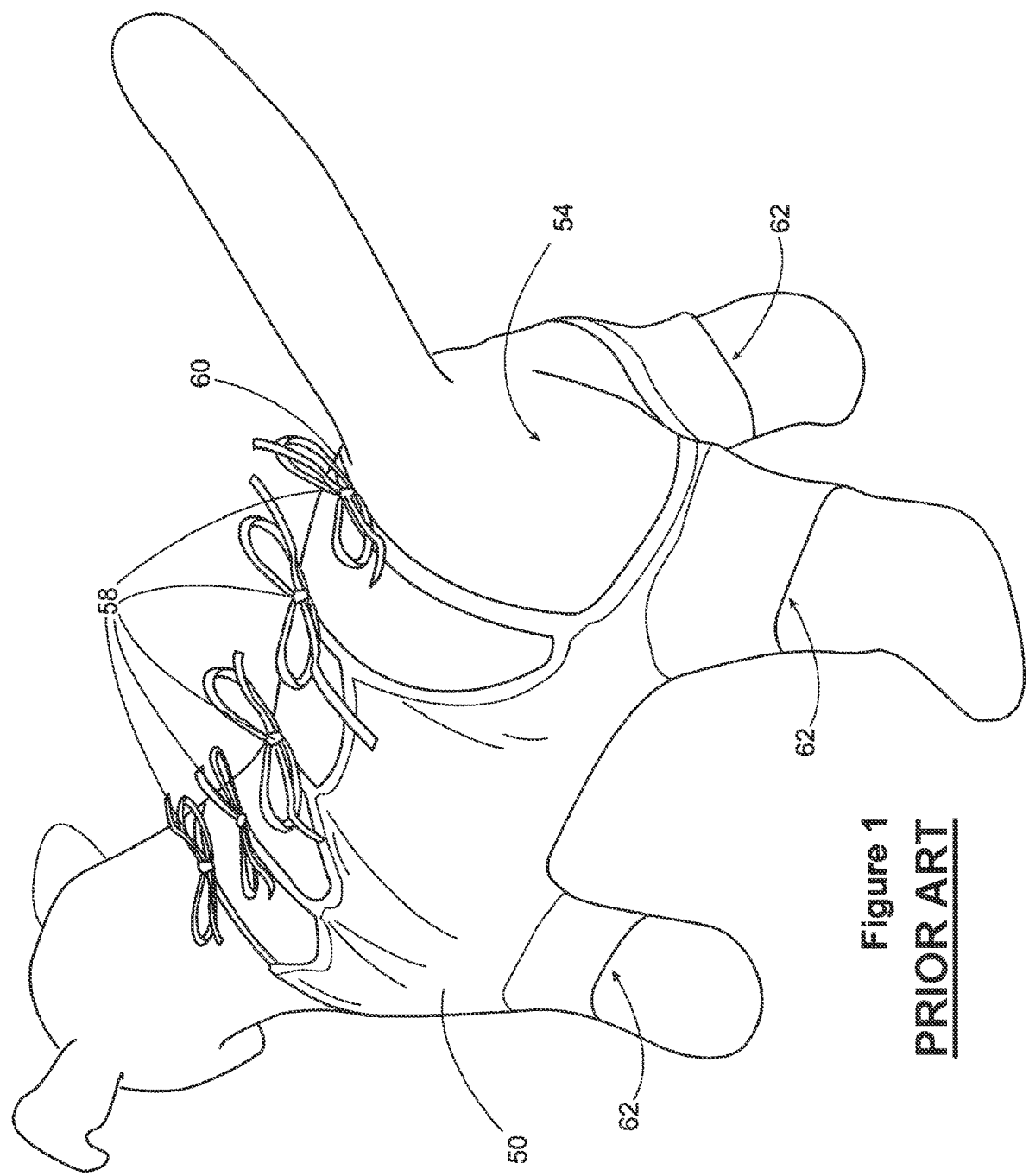
FIG. 1 is a rear perspective view of a prior art animal incision cover for female dogs.
Figure 2:
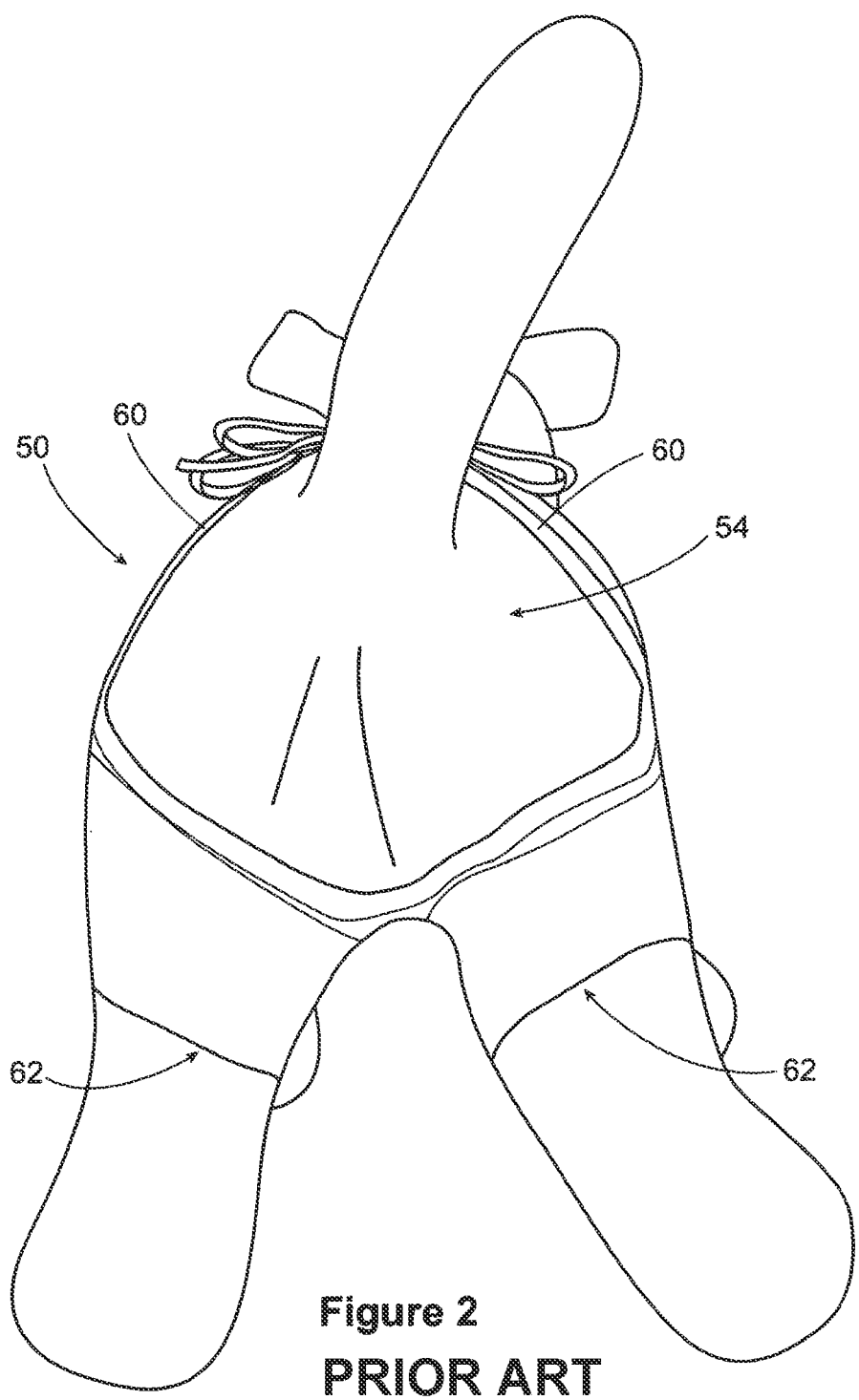
FIG. 2 is a rear elevational view of the prior art animal incision cover of FIG. 1.
Figure 3:
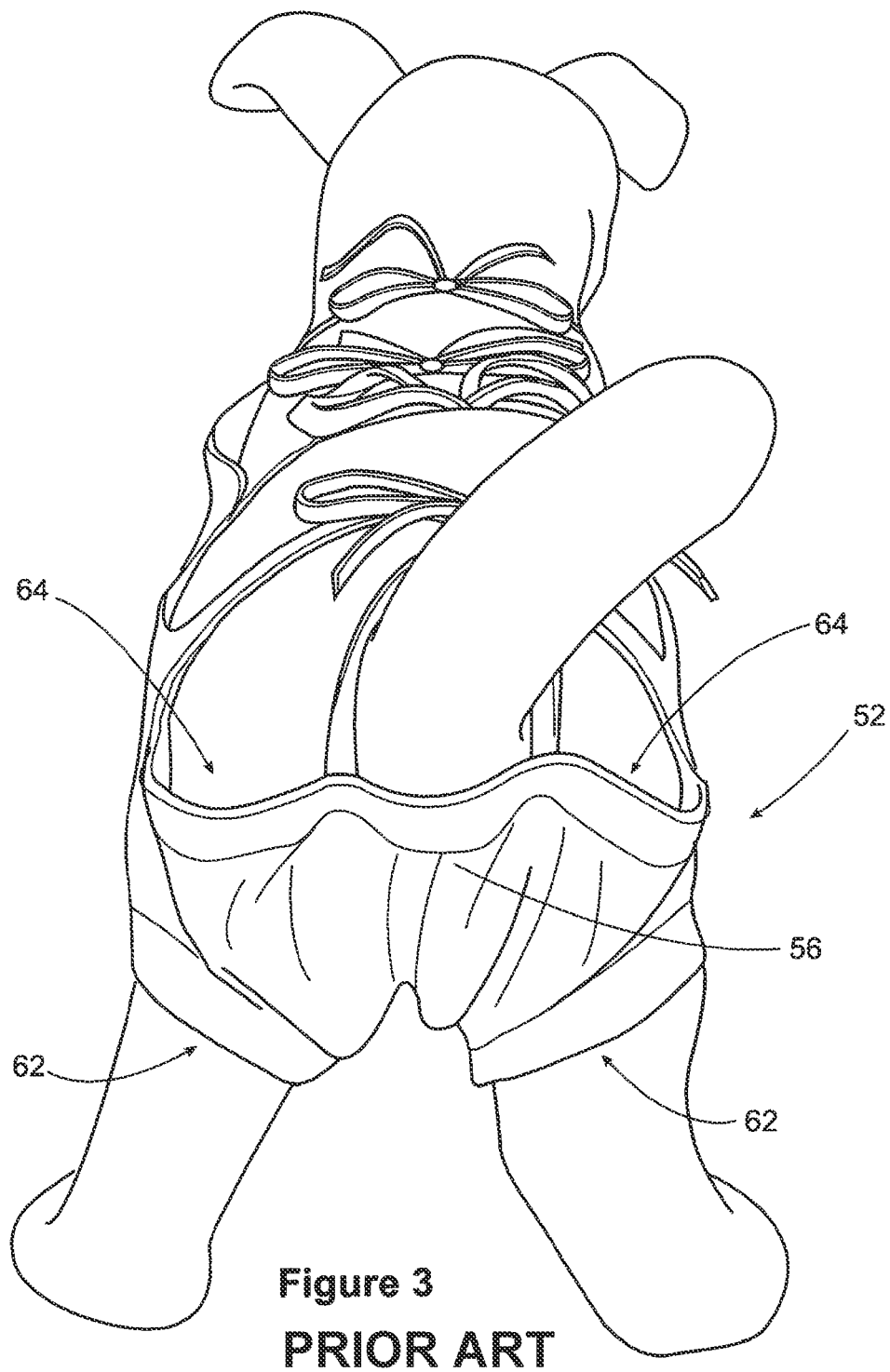
FIG. 3 is a rear elevational view of a prior art animal incision cover for male dogs.
Figure 4:
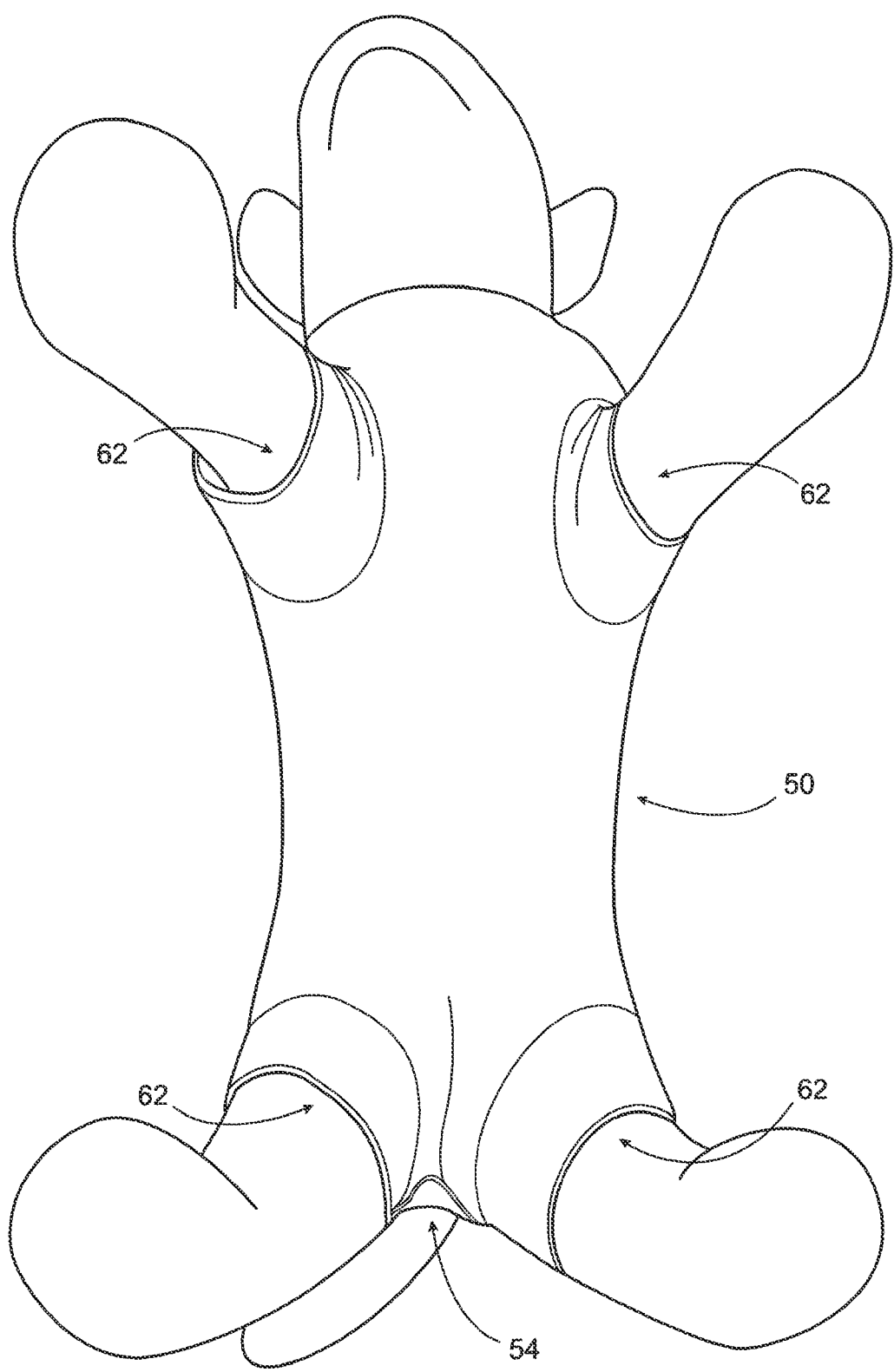
FIG. 4 is a bottom plan view of the prior art animal incision cover of FIG. 1.
Figure 5:
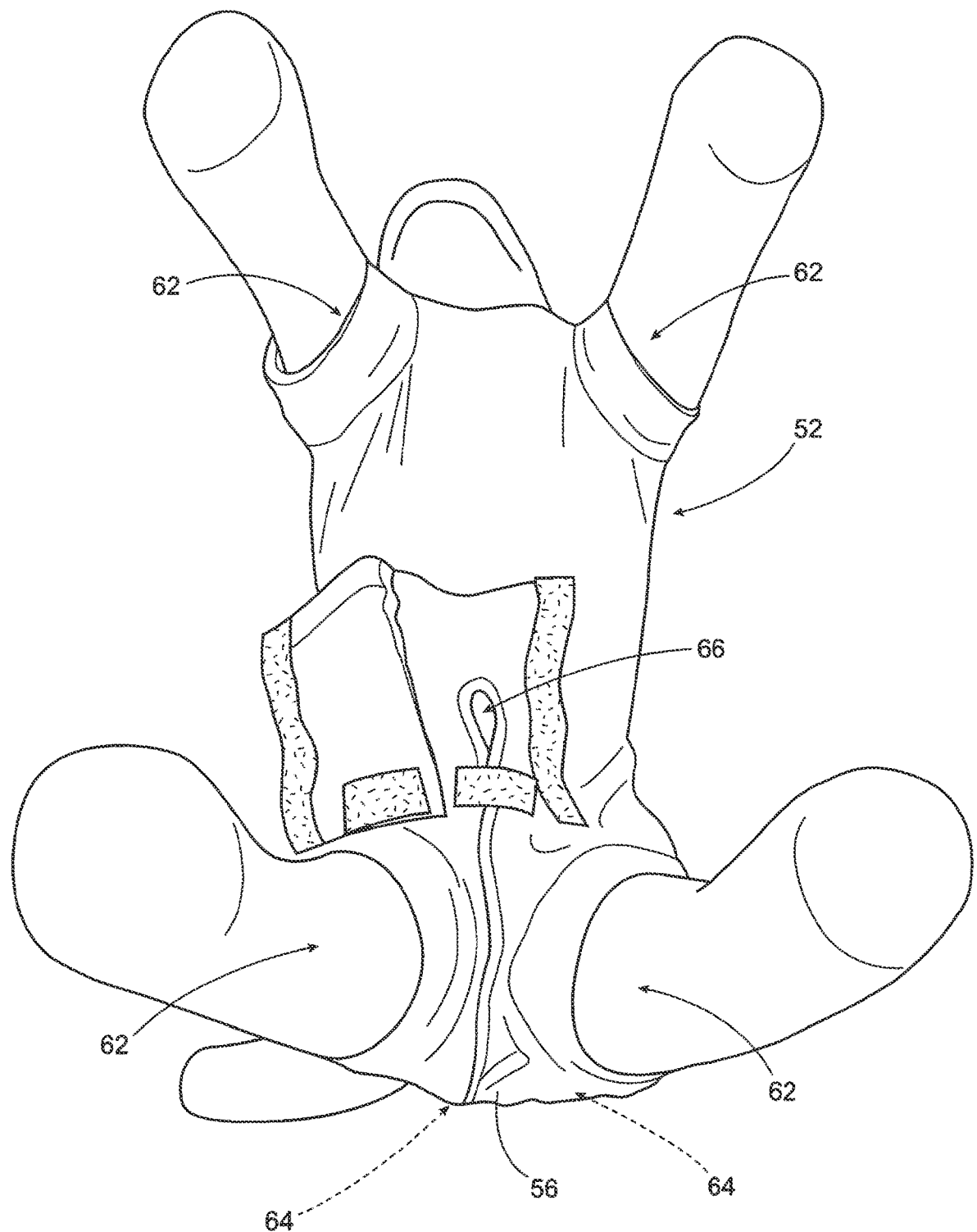
FIG. 5 is a bottom plan view of the prior art animal incision cover of FIG. 3.
Figure 6:
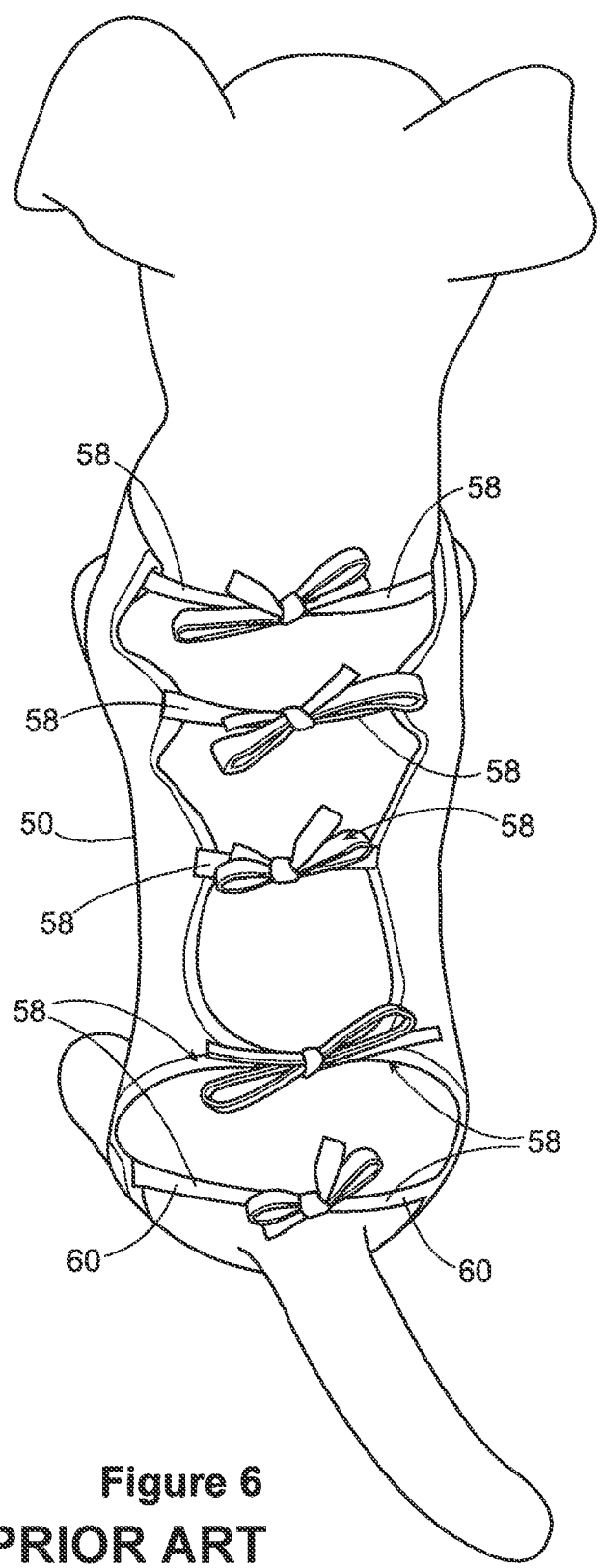
FIG. 6 is a top plan view of the prior art animal incision cover of FIG. 1.
Figure 7:
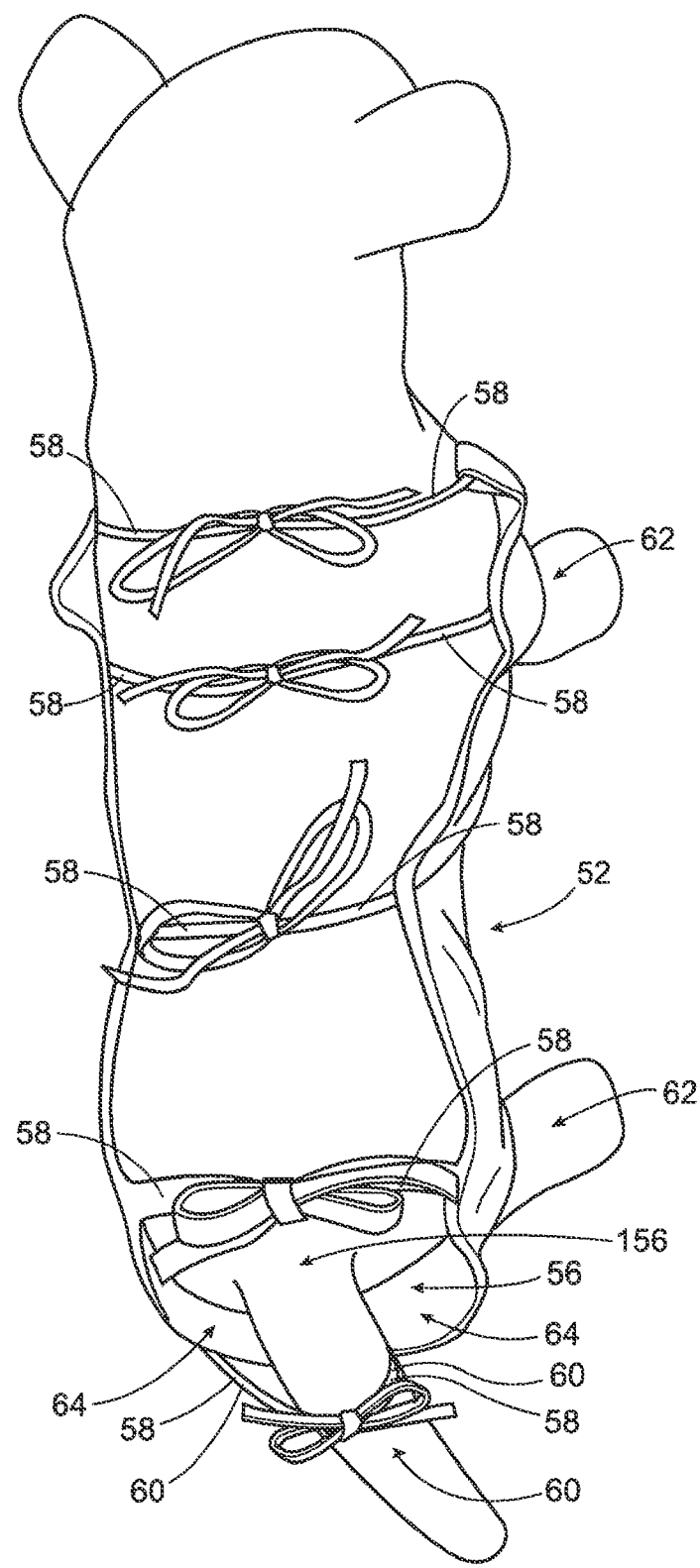
FIG. 7 is a top plan view of the prior art animal incision cover of FIG. 3.
Figure 8:
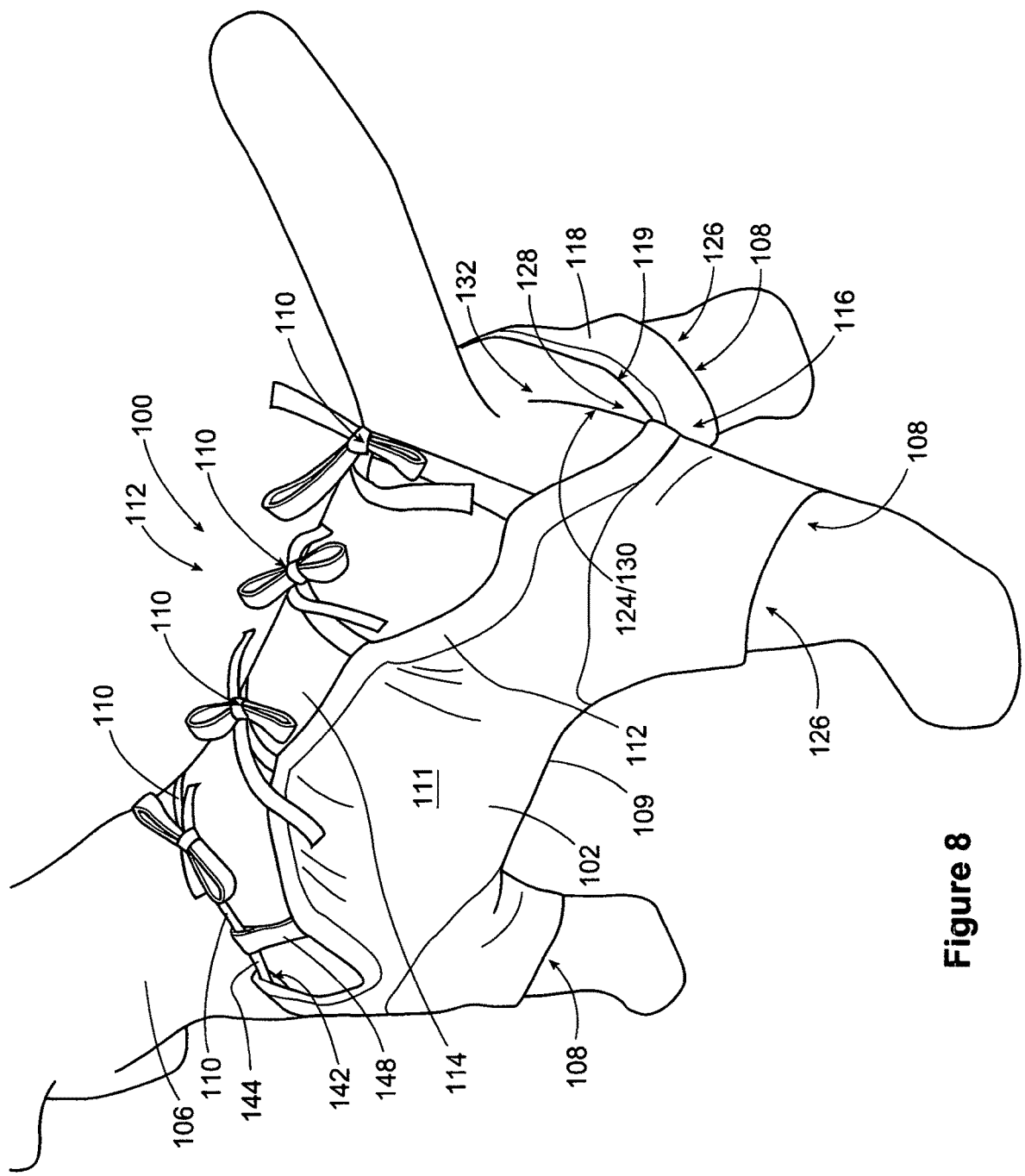
FIG. 8 is a rear perspective view of an embodiment of an animal incision cover oriented for use on a female dog.
Figure 9:
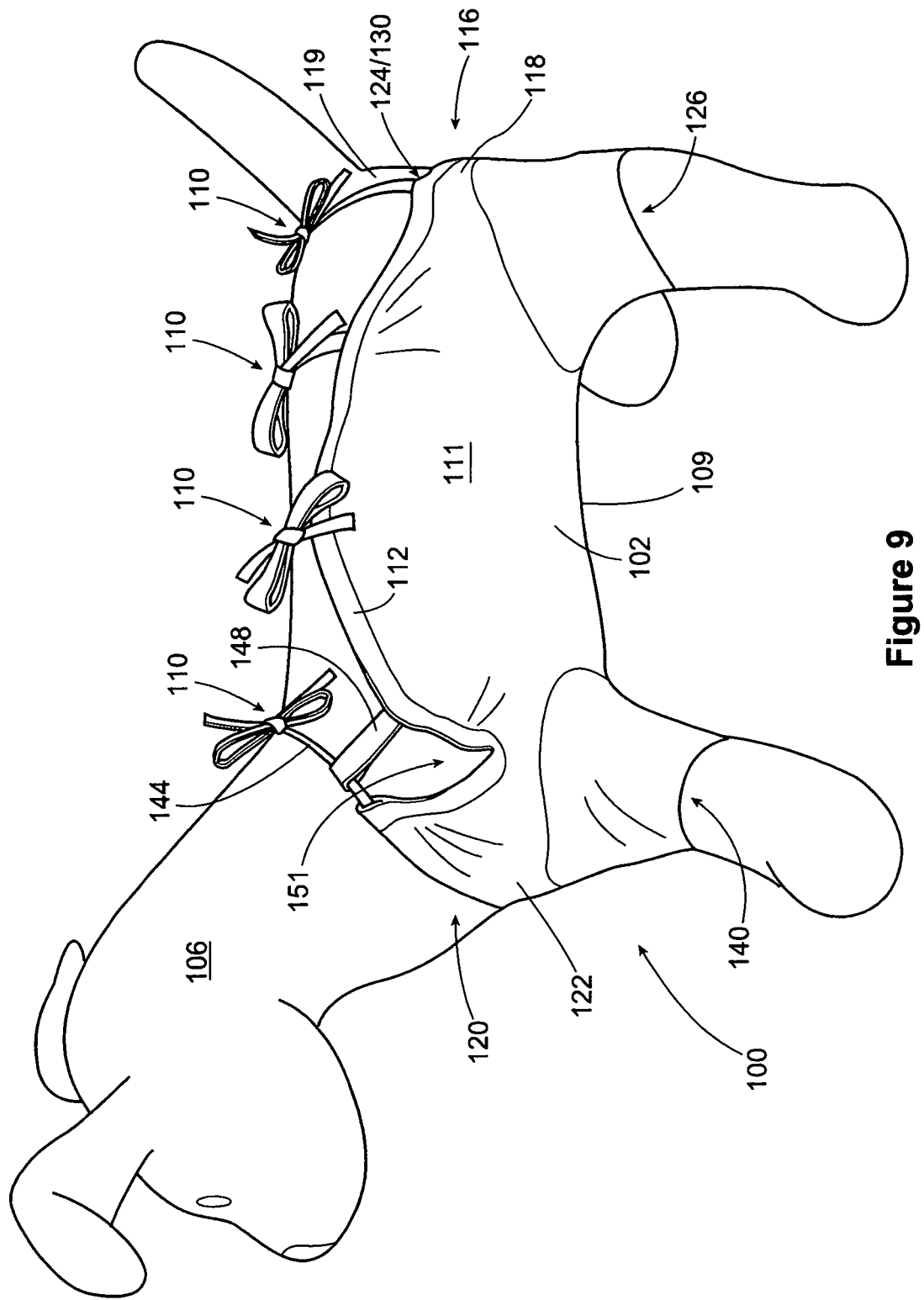
FIG. 9 is a left side elevational view of the embodiment of FIG. 8.
Figure 10:
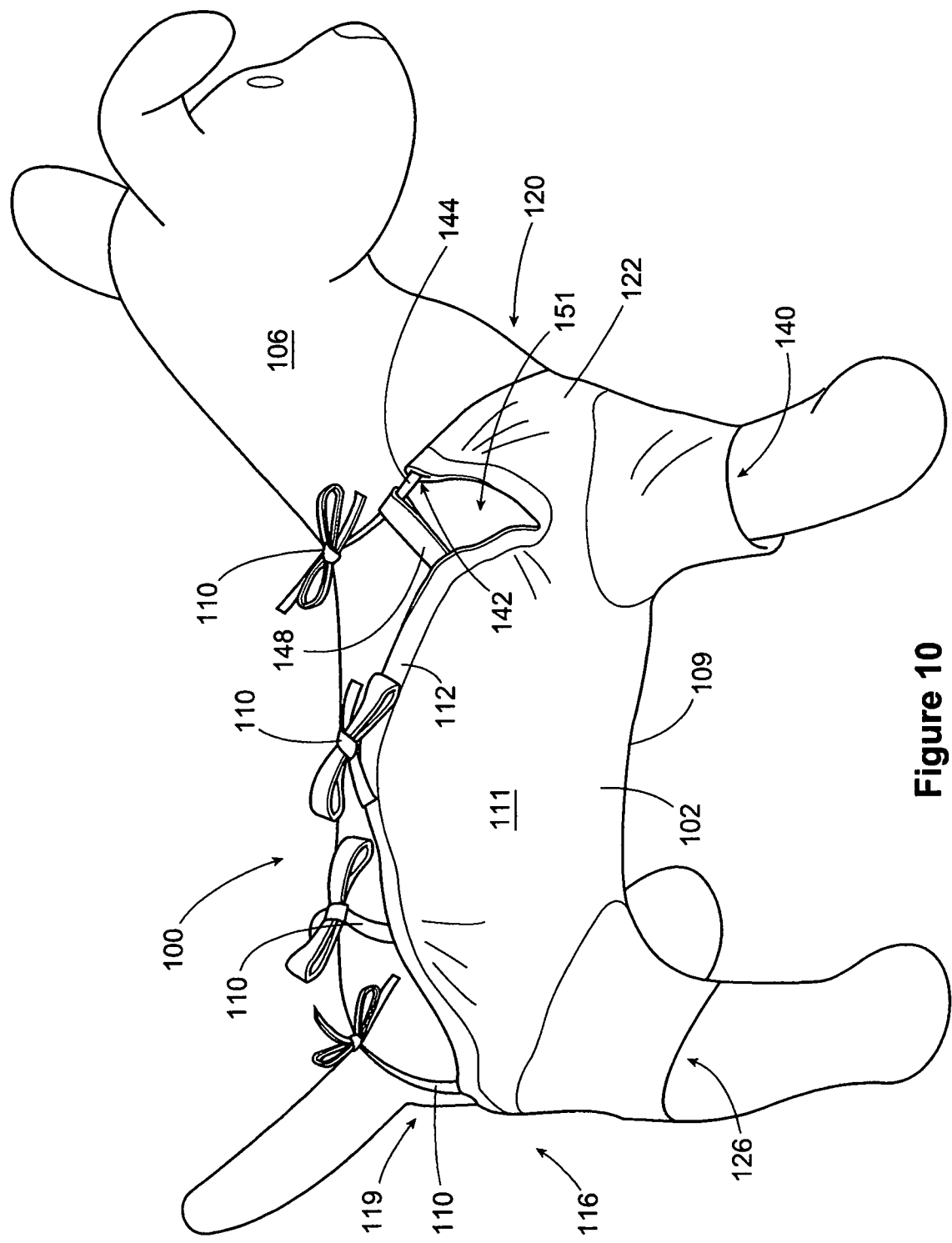
FIG. 10 is a right side elevational view of the embodiment of FIG. 8.
Figure 11:
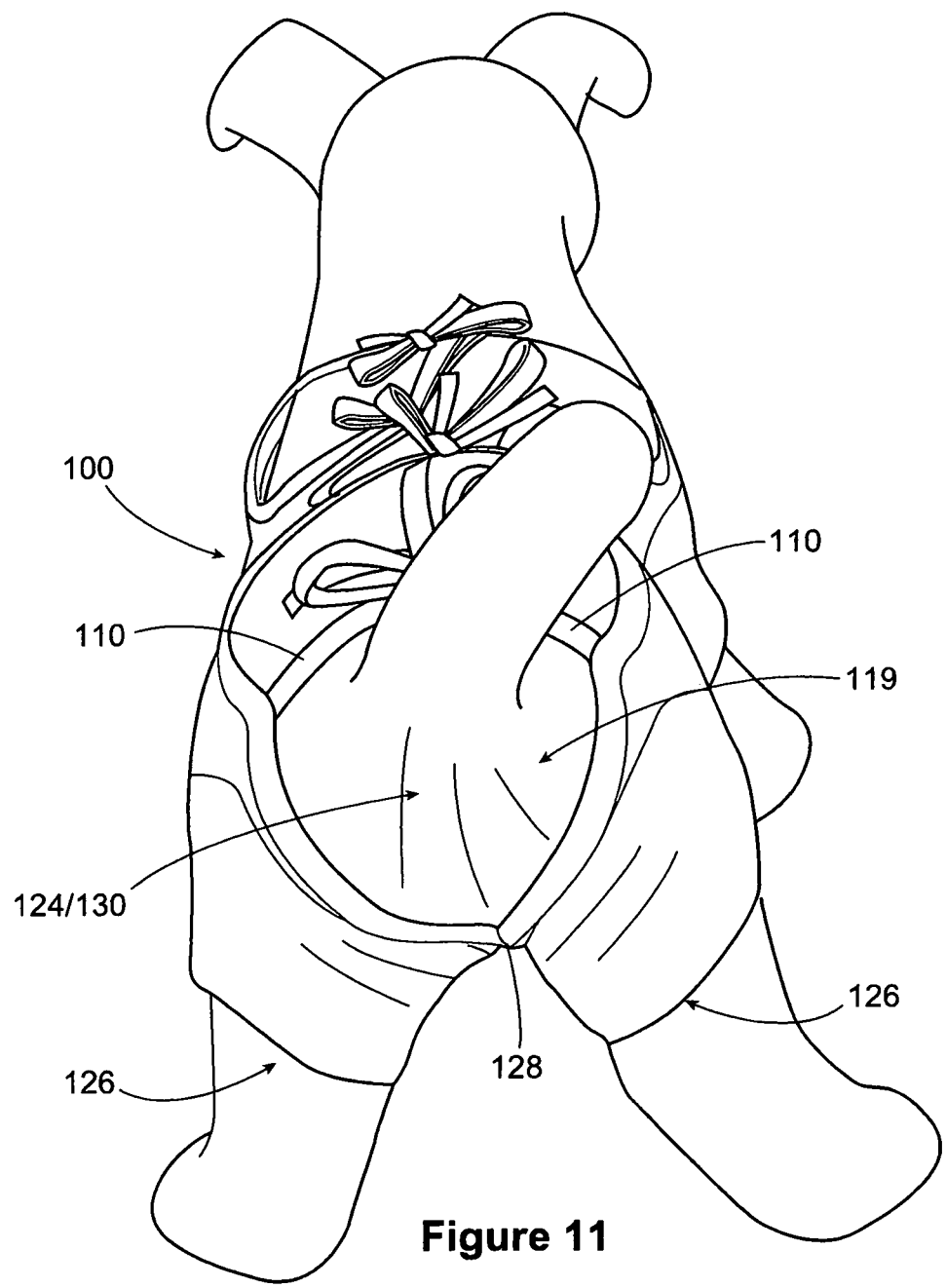
FIG. 11 is a rear elevational view of the embodiment of FIG. 8.
Figure 12:
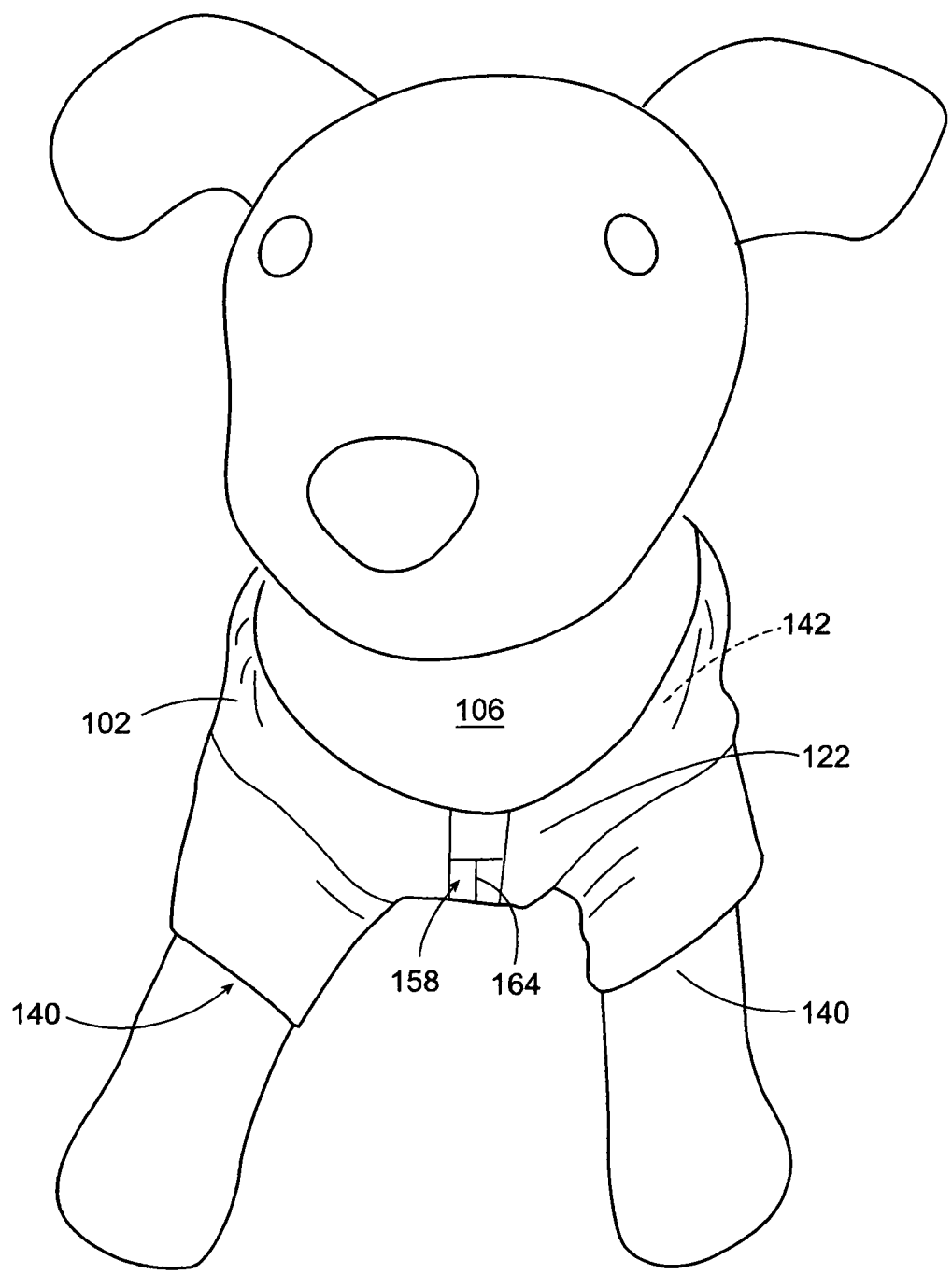
FIG. 12 is a front elevational view of the embodiment of FIG. 8.
Figure 13:
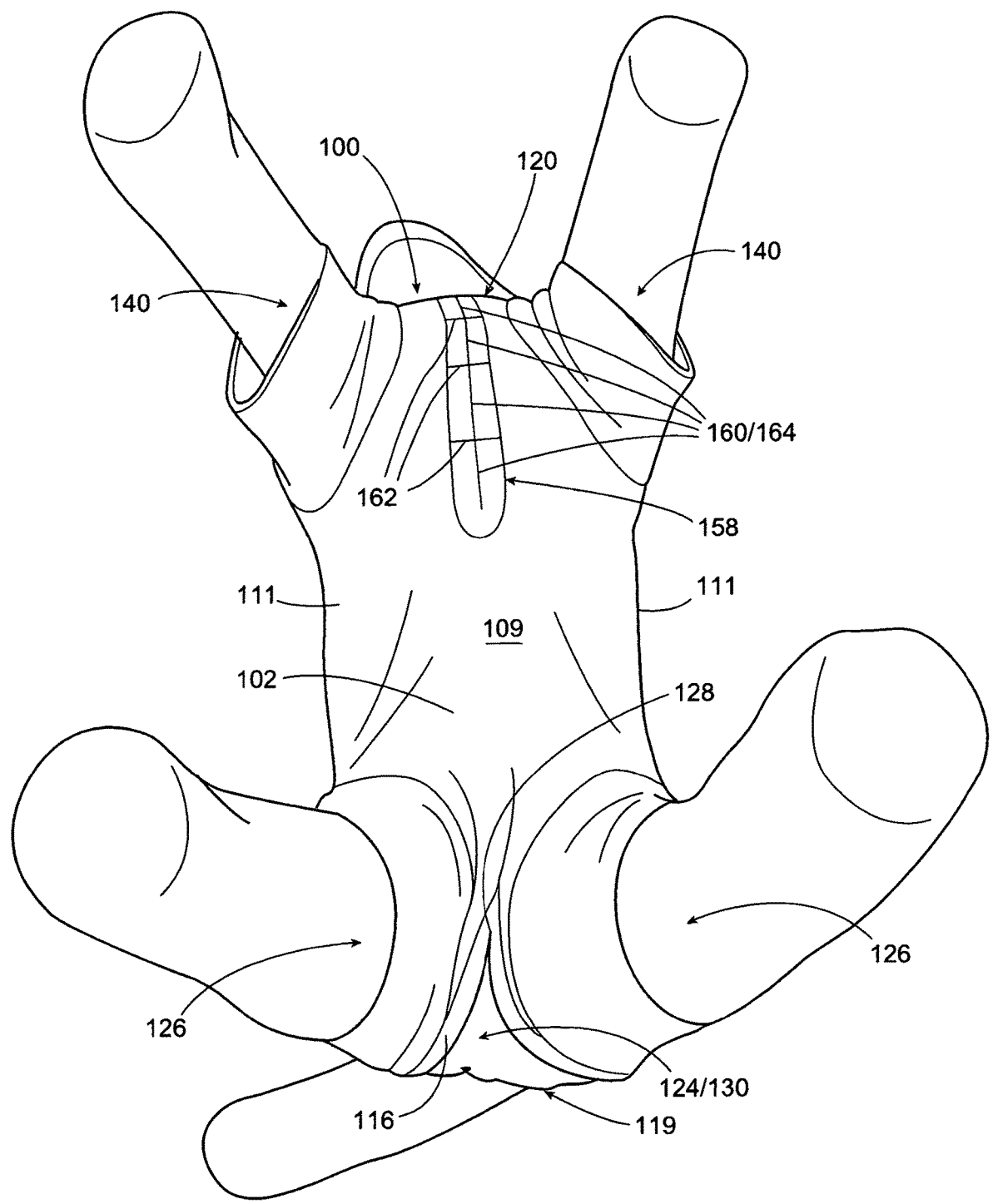
FIG. 13 is a bottom plan view of the embodiment of FIG. 8.
Figure 14:
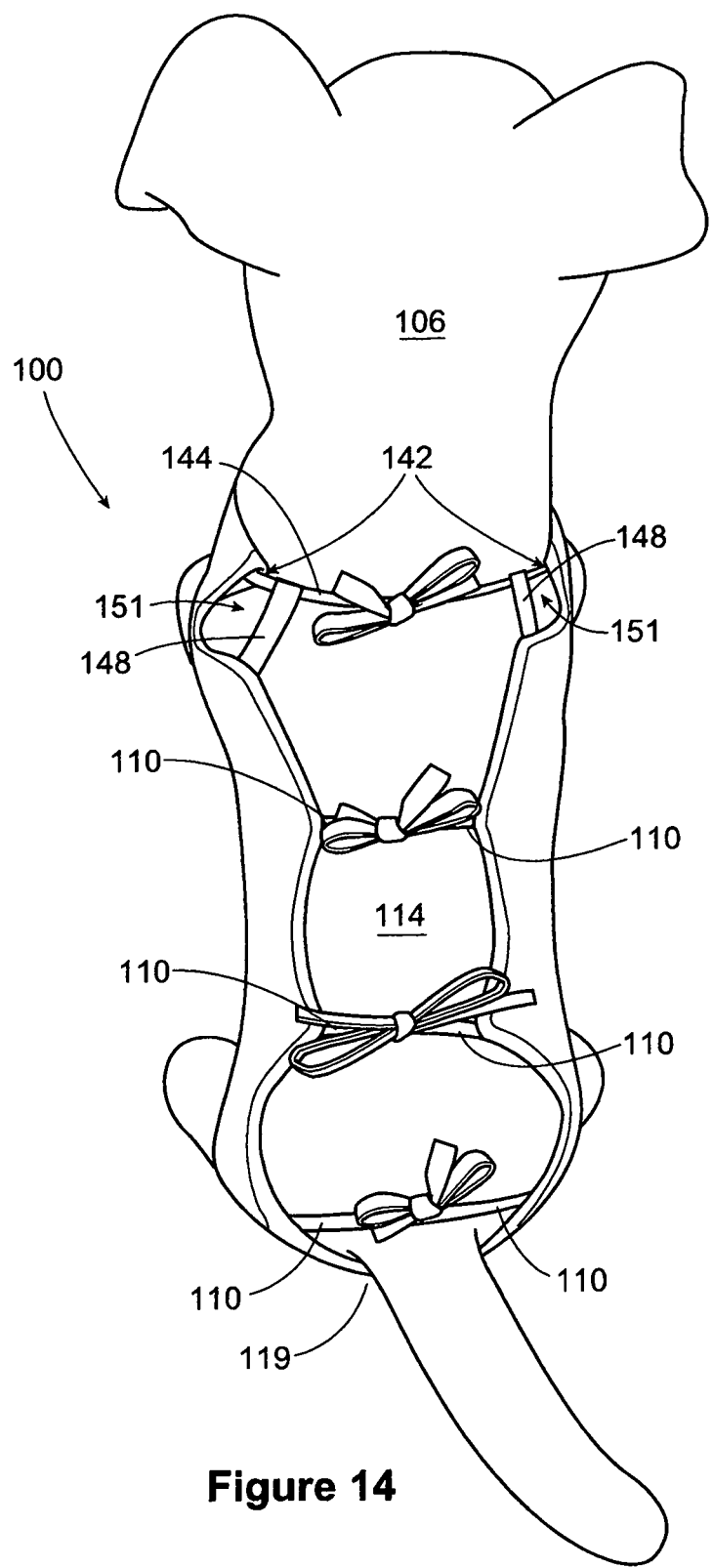
FIG. 14 is a top plan view of the embodiment of FIG. 8.
Figure 15:
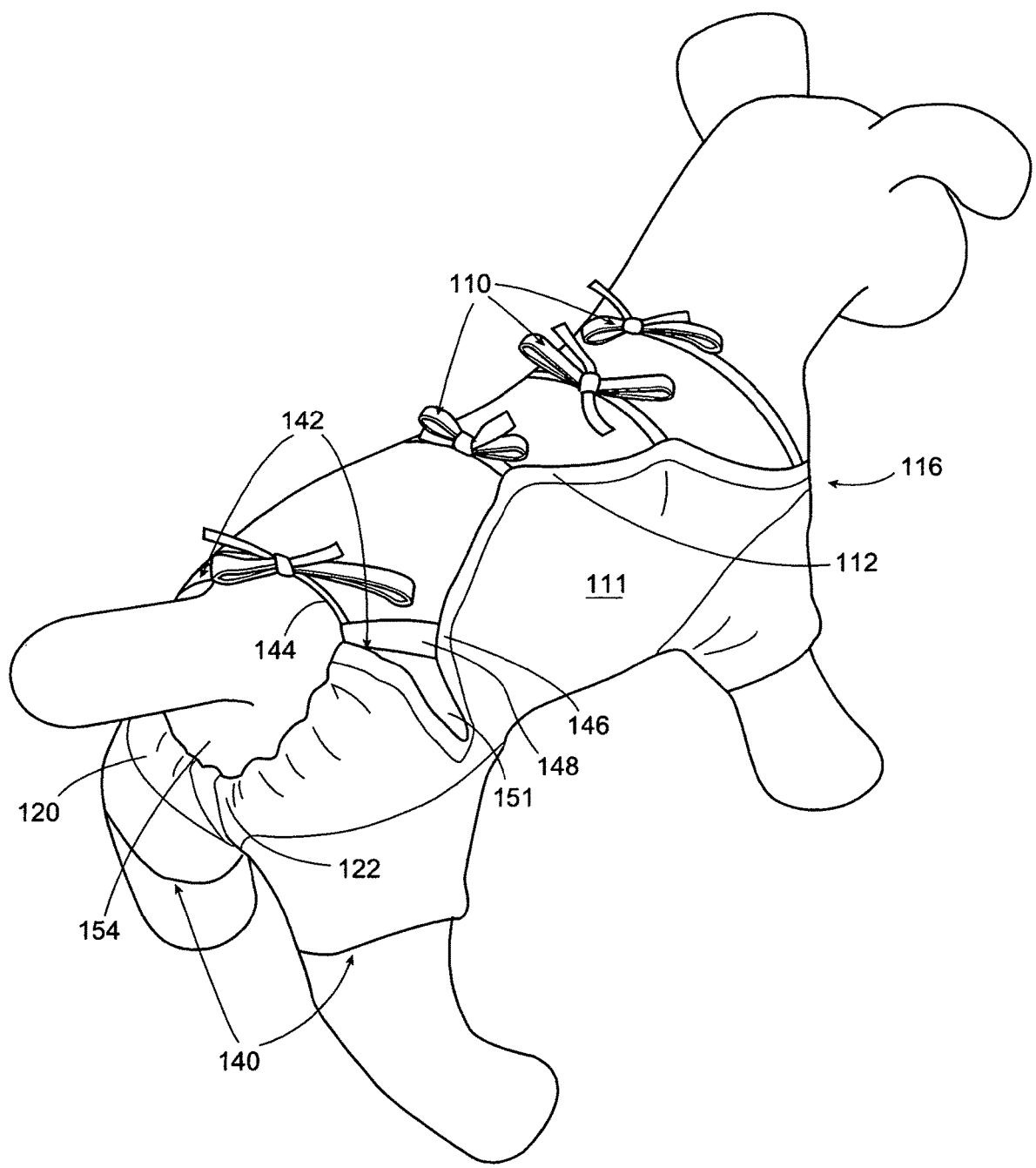
FIG. 15 is a rear perspective view of the animal incision cover of FIG. 8 oriented for use on a male dog.
Figure 16:
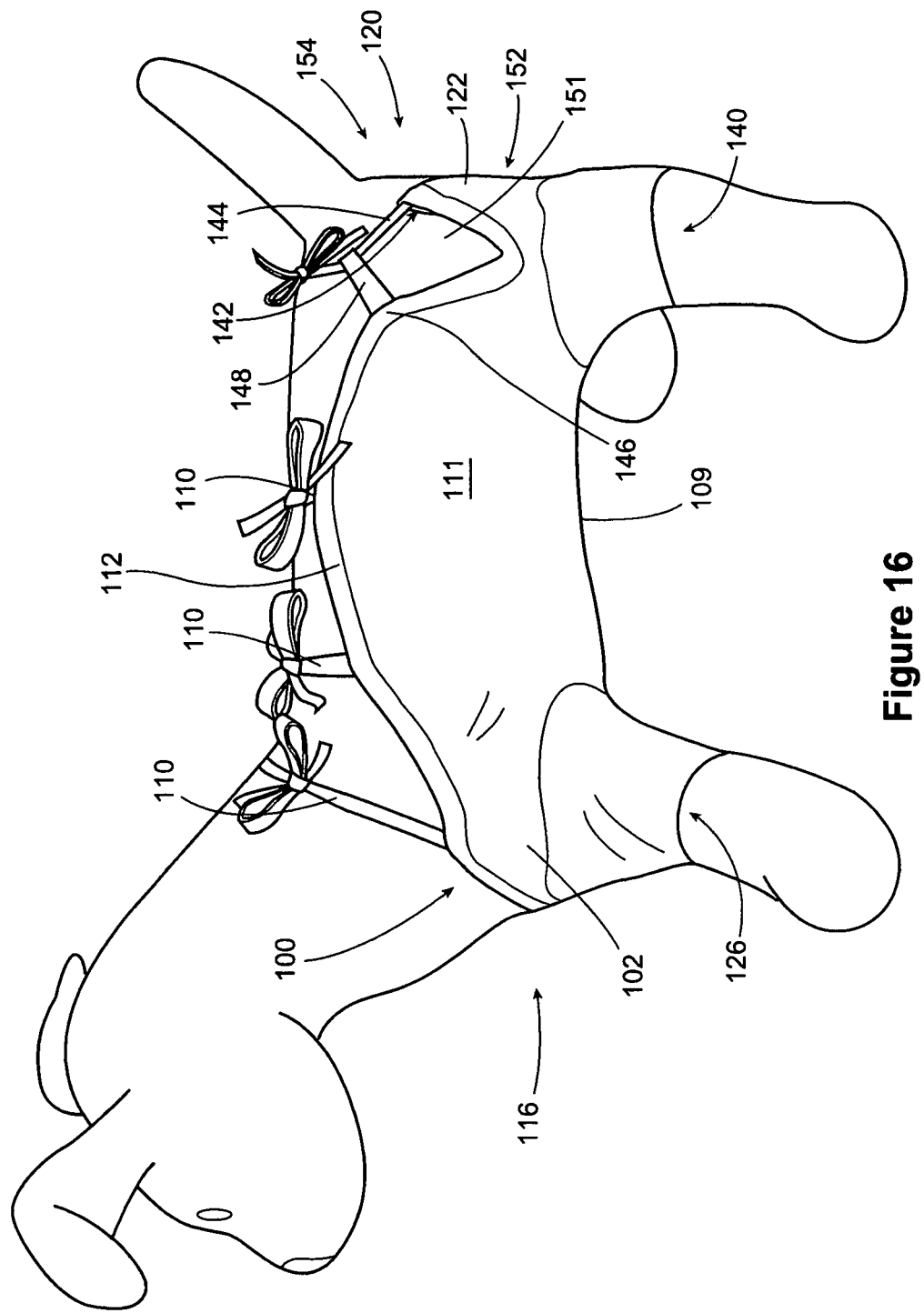
FIG. 16 is a left side elevational view of the embodiment of FIG. 15.
Figure 17:
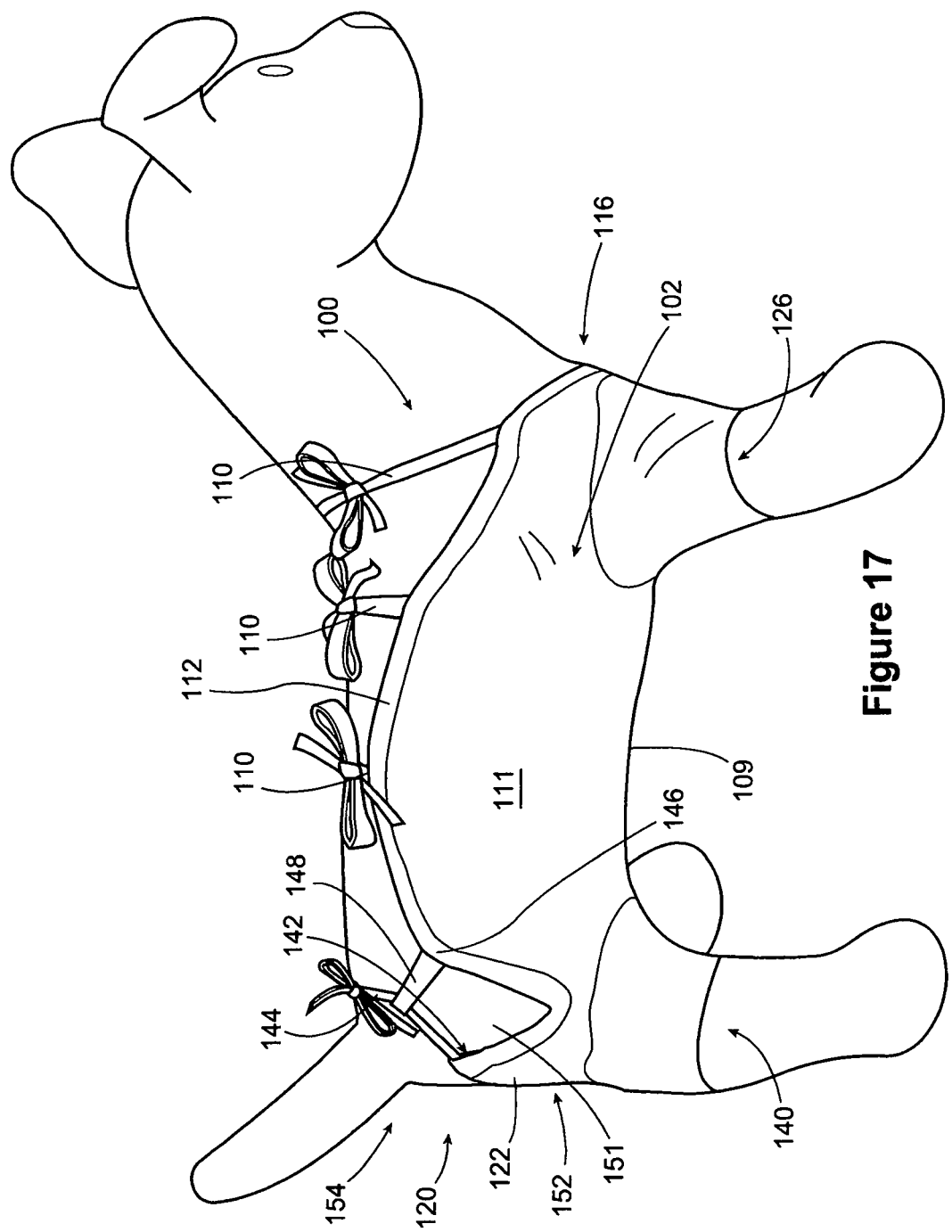
FIG. 17 is a right side elevational view of the embodiment of FIG. 15.
Figure 18:
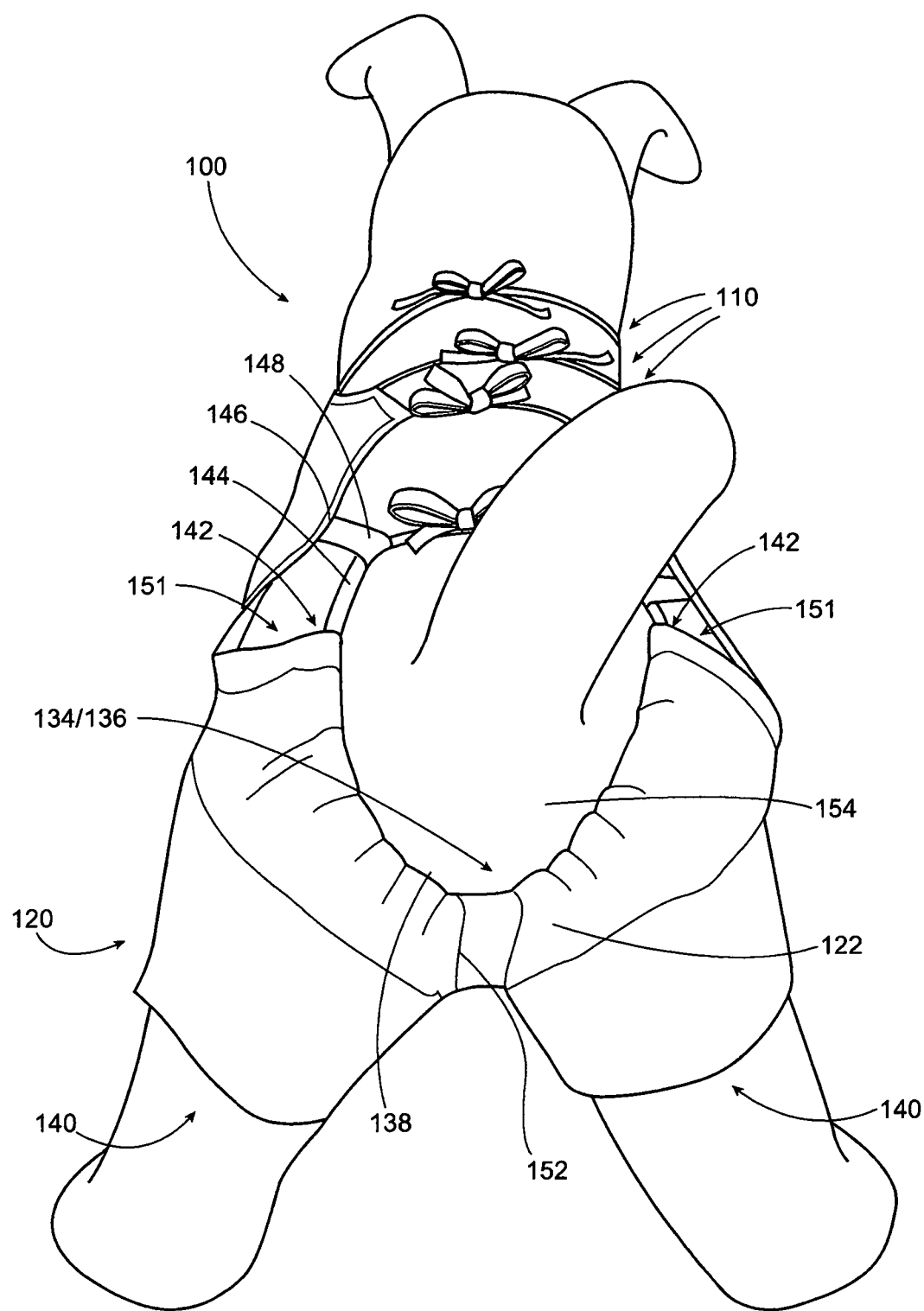
FIG. 18 is a rear elevational view of the embodiment of FIG. 15.
Figure 19:
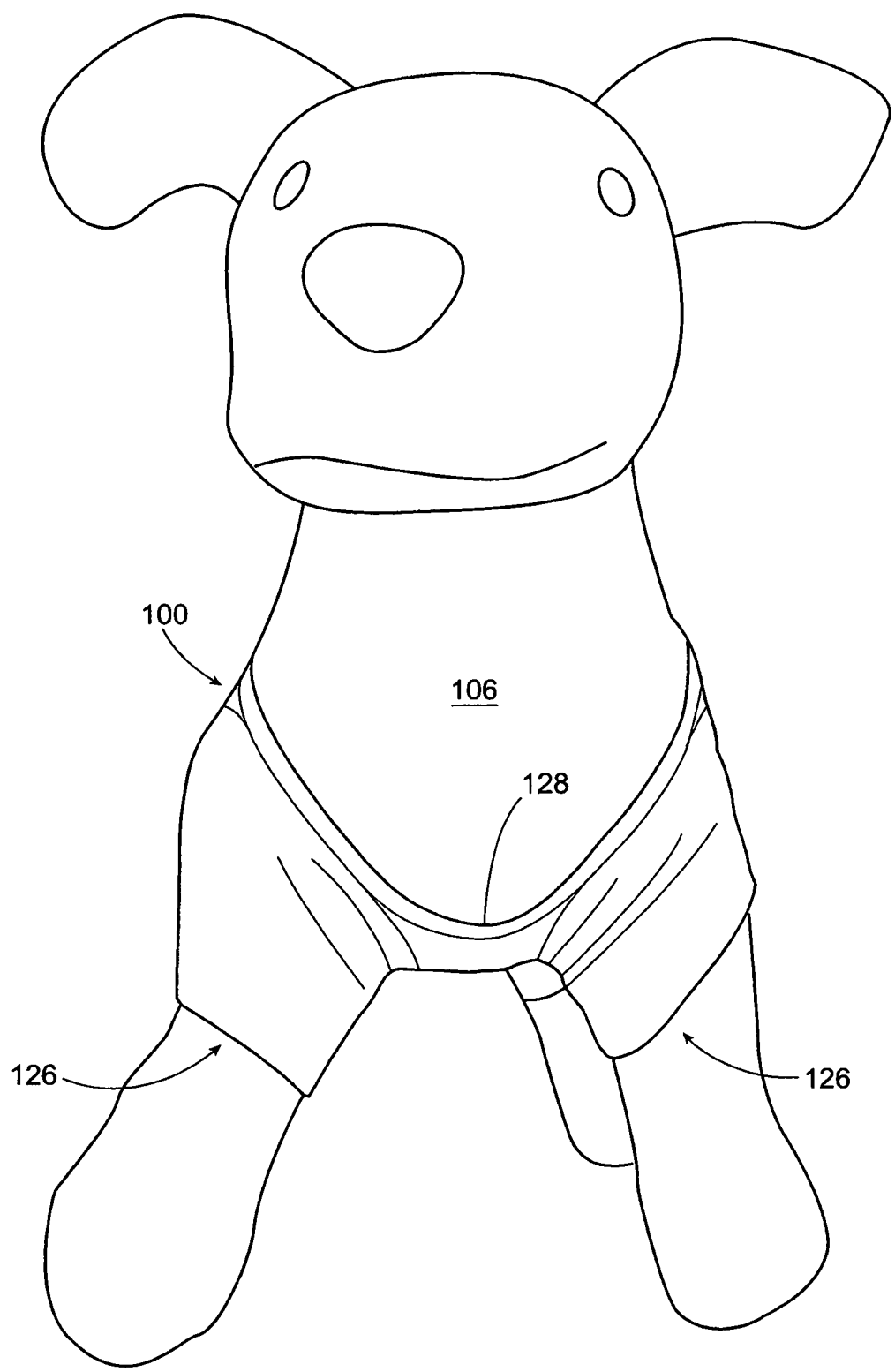
FIG. 19 is a front elevational view of the embodiment of FIG. 15.

FIGS. 1, 2, 4 and 6 show a prior art female animal incision cover 50 on a model of a dog 106. FIGS. 3, 5 and 7 show a prior art male animal incision cover 52 on a model of a dog 106. FIG. 1 shows a prior art female animal incision cover 50 disclosing a female rear access area 54 and prior art ties 58 including prior art rear ties 60, together with leg apertures 62. Similarly FIG. 2 shows a prior art female animal incision cover 50 showing female rear access area 54, prior art rear ties 60 and leg apertures 62. Similarly, FIG. 4 shows prior art female animal incision cover 50 showing female rear access area 54 and leg apertures 62. Similarly, FIG. 6 shows prior art female animal incision cover 50 showing 5 sets of prior art ties 58, and in particular prior art rear ties 60.

FIGS. 3, 5 and 7 show a prior art male animal incision cover 52 showing male rear coverage area 56 and showing gaps 64 in male rear coverage area 56, as well as leg apertures 62. FIG. 7 shows prior art ties 58, including prior art rear ties 60 shown having slipped rearwardly past the juncture between tail and body 156 of a dog. FIG. 3 and FIG. 5 show leg apertures 62. FIG. 5 shows prior art penis aperture 66 in a fixed location.

The specification is directed to a reversible wearable animal incision cover only for dogs and any reference to the word animal or animals is restricted to dog or dogs.

Figure 22:
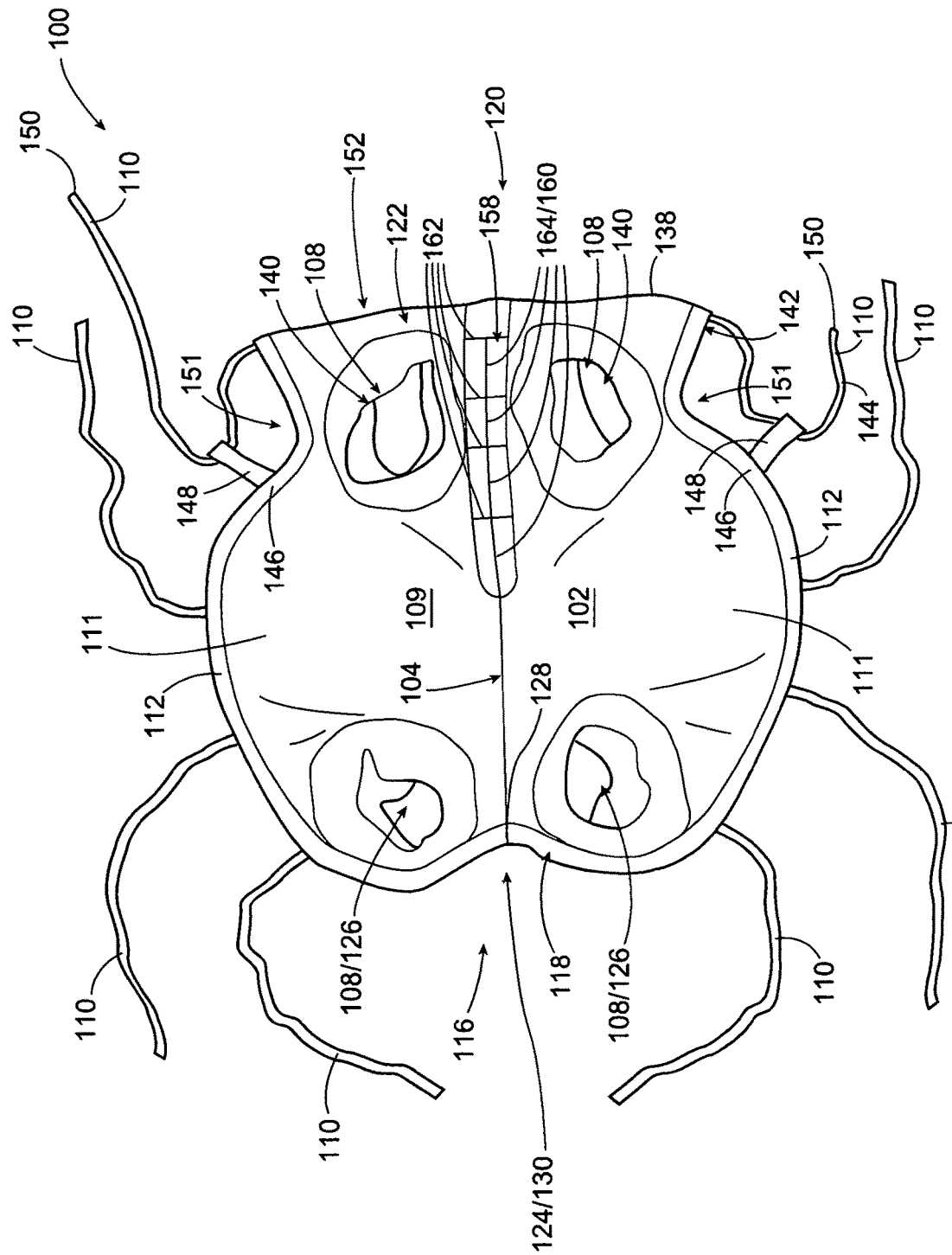
FIG. 22 is a top plan (inside) view of the embodiment of FIGS. 8 and 15 shown laid flat.
Figure 23:
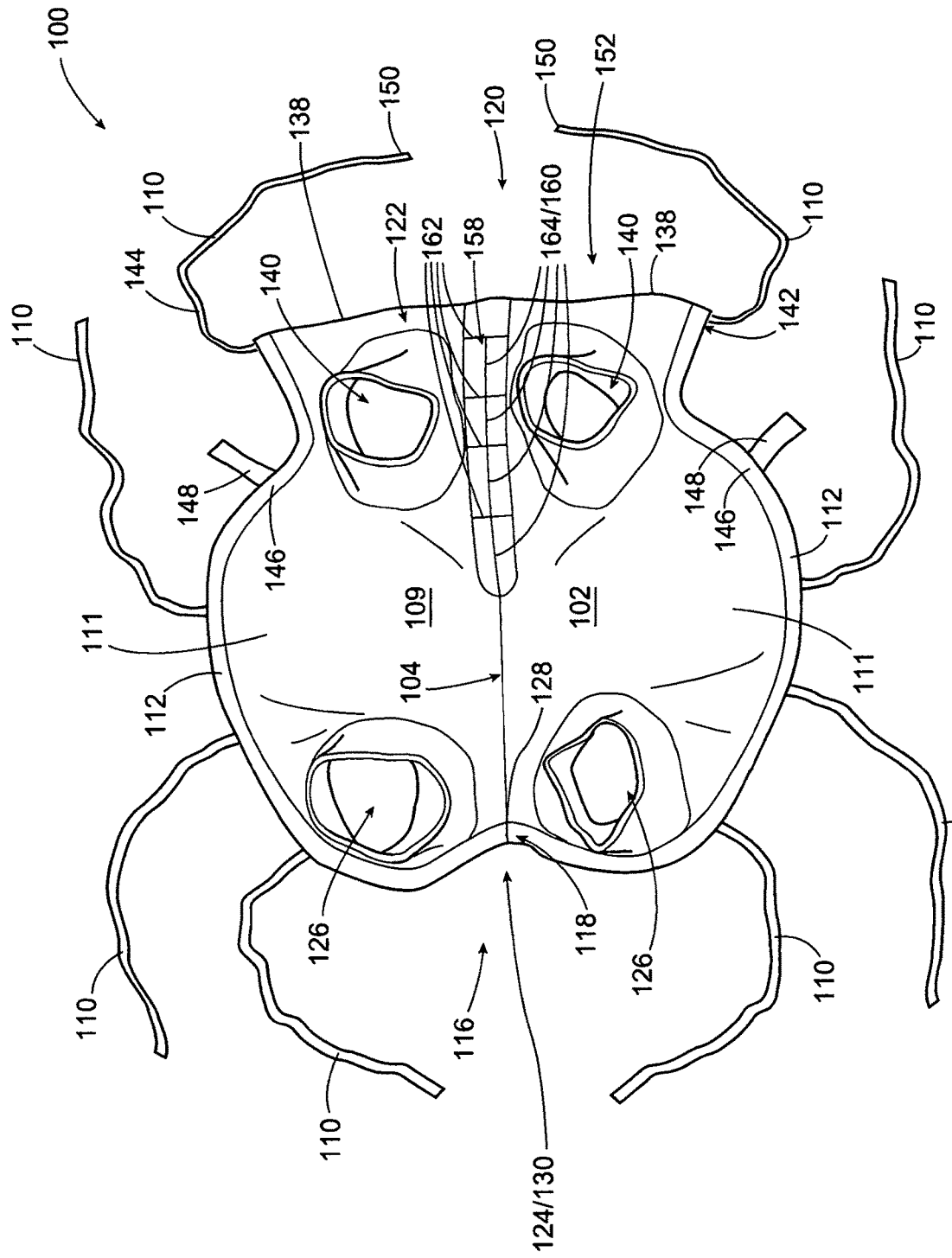
FIG. 23 is a bottom plan (outside) view of the embodiment of FIGS. 8 and 15 shown laid flat.

FIGS. 22 and 23 show one embodiment of a reversible wearable animal incision cover 100 configured about a longitudinal axis 104 for alignment along the bottom of the length of an animal 106 (not shown in FIGS. 22 and 23) along a web 102 having a first end 116 at an end of the longitudinal axis 104 and a second end 120 at another end of longitudinal axis 104, the first end 116 to be placed over the rear of female animal 119 and the second end 120 to be placed over the rear of male animal 154. The first end 116 is configured to allow a female animal 106 to urinate without obstruction and the second end is configured to cover the testicles 136 and/or the area where the testicles 136 were joined to the body of a male animal 106 before the testicles were removed. The prior placement is referred to as the female orientation which is depicted in FIGS. 8 through 14 and the latter placement is referred to as the male orientation which is depicted in FIGS. 15 to 21. The animals representing a female dog in FIGS. 8 through 14 and representing a male dog in FIGS. 15 through 21 are depicted for illustrating placement of cover 100 and the animal does not form a part of the invention.

Accordingly, in the female orientation the second end 120 comprising the male rear body covering portion 122 is generally placed along the chest and the neck of the female animal 106 and in the male orientation the first end 116 comprising the female rear body covering portion 118 is generally placed along the chest and the neck of the male animal 106. As the neutering procedure for dogs does not involve the front portion of animals 106 the precise placement of the first end 116 or the second end 120 at the front of animals 106 is not critical, permitting web 102 of cover 100 to be longitudinally reversed or rotated about 180 degrees for male and female animals and in particular for neutering procedures for male and female animals. This reversibility typically means that a veterinarian would only need to stock one reversible cover 100 for both male and female animals in a particular size or weight category.

FIGS. 22 and 23 show one embodiment of the invention laid flat. FIG. 22 is a top inside view of cover 100 and FIG. 23 is a bottom outside view of cover 100, for placement over the bottom of animal 106 (not shown in FIGS. 22 and 23) and upwardly over the sides of animal 106 (not shown in FIGS. 22 and 23). The bottom of web 109 comprises four leg apertures 108.

Web 102 has at one end of longitudinal axis 104 a first end 116 comprising a female rear body covering portion 118 for placement against the rear of female animal 119 (not shown in FIGS. 22 and 23). For a female animal 106 first end 116 and female rear body covering portion 118 are to be placed along the rear of female animal 119.

Leg apertures 108 at the first end 116 of web 102 comprise female animal rear leg apertures 126. Female rear body covering portion 118 defines a female urinary channel 124, which may be a V-shaped female urinary channel 130, and which may extend from a Vertex 128 substantially commencing between female animal rear leg apertures 126, which Channel 124/130 substantially leaves the female animal's external genitals required for urination unobstructed so as not to interfere with urination. In this specification V-shaped includes U-shaped or other similar shape which would be known to those in the art to substantially leave the female animal's external genitals required for urination unobstructed so as not to interfere with urination.

Web 102 has at another end of longitudinal axis 104 a second end 120 comprising a male rear body covering portion 122 for placement along the rear of male animal 154. For a male animal 106, and in particular a dog or cat, second end 120 and male rear body covering portion 122 are to be placed along the rear of male animal 154.

Leg apertures 108 at the second end 120 of web 102 comprise male animal rear leg apertures 140. Male rear body covering portion 122 comprises rear panel 152 for drawing upwardly to cover the testicles or the area where the testicles would be joined to the body of male animal 106.

FIGS. 22 and 23 show web 102, with sides of web 111 having side edges 112, which side edges 112 are tied together by ties 110 over the back 114 (not shown in FIGS. 22 and 23) of animal 106 (not shown in FIGS. 22 and 23). Pairs of cooperating ties 110 are attached to each of the side edges 112 of Sides of web 111 and which are tied together to retain web 102 snugly against animal 106. Side edges 112 may be drawn together to retain web 102 snugly against animal 106 by means of any type of connector operably connecting opposing side edges 112 of web 102. Connectors may have a cooperating structure attached to each of the two opposing side edges 112 or connectors may be attached fixedly or removably to one of the side edges 112 and comprise means for attachment to the opposing side edge 112. Alternatively, connectors may be attached to web sides 111 or even bottom of web 109. Connectors may be ties, straps, hooks and loop fasteners, snaps or other connectors known to those in the art. Connectors may also be one connector such as a zipper. The most rearward connector may include a pair of cooperating ties 110 or may comprise a drawstring 144 disposed through a drawstring channel 142 in a rear panel 152 of male rear body covering portion 122, which drawstring 144 may or may not also be disposed through loops 148.

FIGS. 15 to 22 also show drawstring 144 disposed through drawstring channel 142 and through loops 148 for tying the ends of drawstring 144 together to retain rear panel 152 of male rear body covering portion 122 against the rear of a male animal 106. Drawstring channel 142 may be located in rear panel 152 along rear edge of web 138. The height of the rear edge of web 138 and rear panel 152 may be adjusted by tightening or loosening drawstring 144. Drawstring 144 may be disposed through loops 148 to draw rear panel 152 snugly against the rear of male animal 154. Web sides 111 may also each comprise a notch 151 or cut out between loop 148 and drawstring channel 142, notch 151 extending inwardly from rear side edge 146 for allowing rear panel 152 to be drawn towards web sides 111 of web 102.

Figure 20:
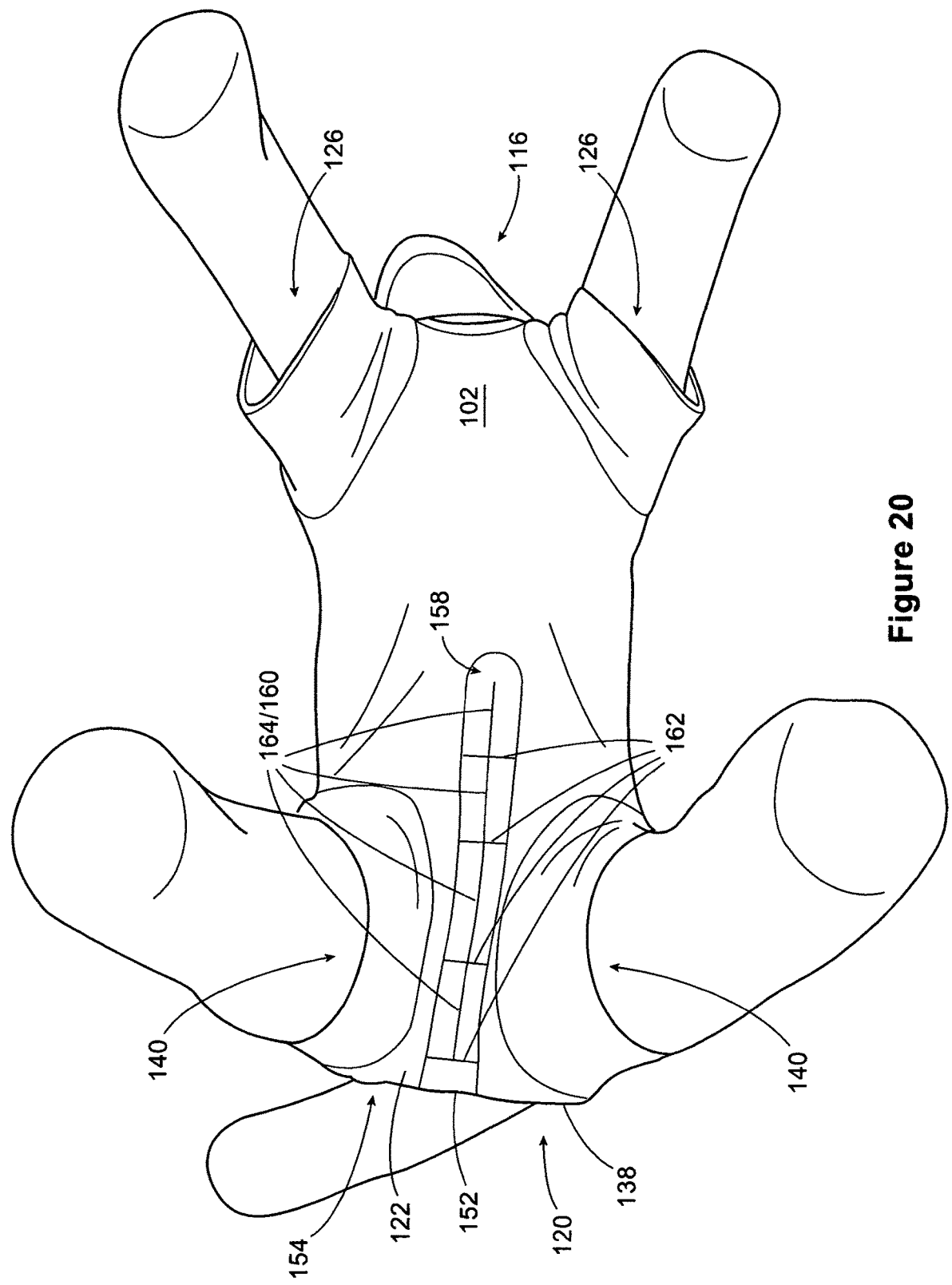
FIG. 20 is a bottom plan view of the embodiment of FIG. 15.
Figure 21:
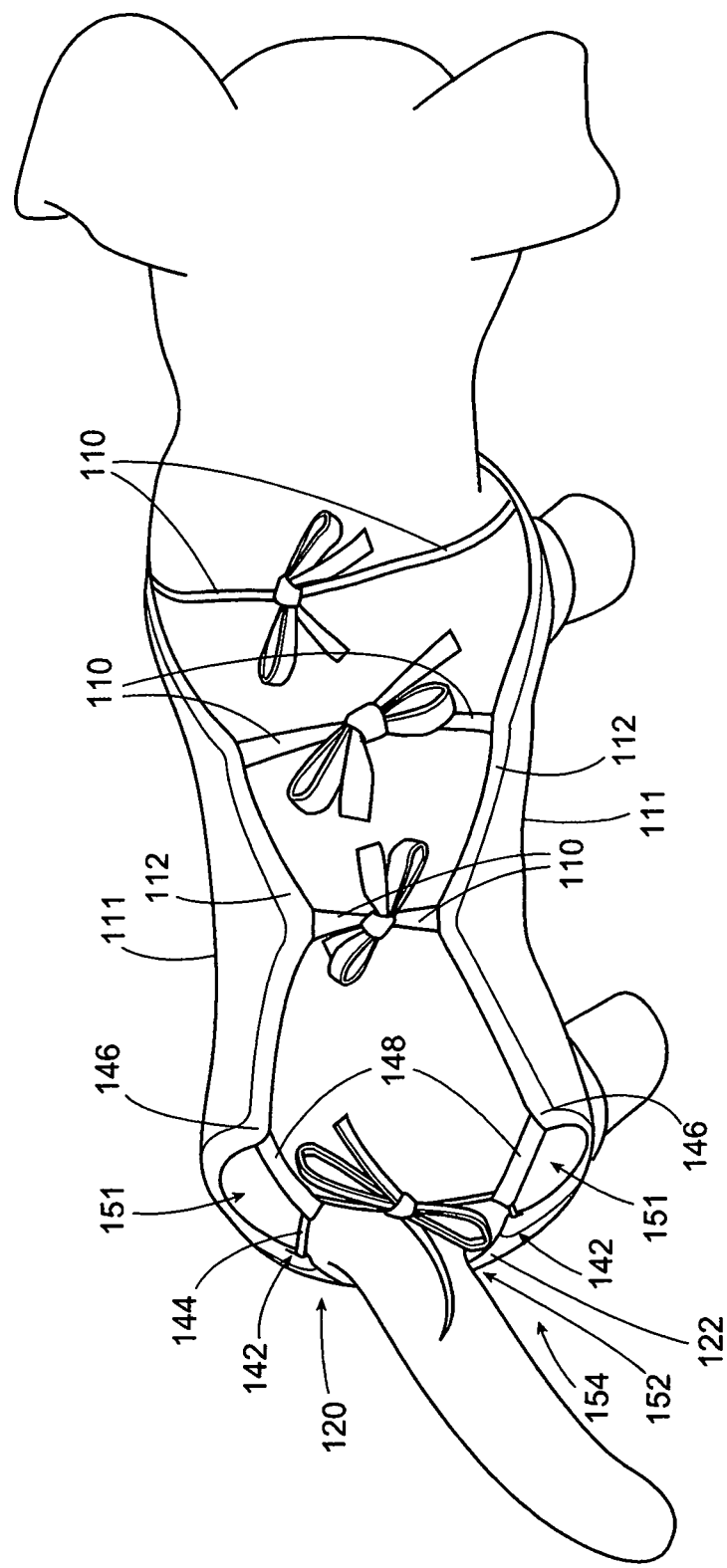
FIG. 21 is a top plan view of the embodiment of FIG. 15.

FIGS. 20, 22 and 23 show a selection area 158 substantially along the longitudinal axis 104 (not shown in FIG. 20) along the bottom of web 109, the selection area 158 comprising a plurality of substantially longitudinally arranged openable penis apertures 160, separated by reinforcements 162. Selection area 158 may run forwardly from drawstring channel 142. Openable penis apertures 160 may be opened by removing releasable stitching 164, or openable penis apertures may be held closed by other releasable means. Reinforcements 162 may comprise non-removable stitching, which may be transverse to longitudinal axis 104. However, reinforcements may be any structure preventing an opened openable penis aperture 160 from tearing open an adjacent unopened openable penis aperture 160 during use. Each openable penis aperture 160 may be adjacent to another openable penis aperture 160

Web 102 may have fixedly or removably attached thereto a dressing positioned to overlie the site or sites of incisions for male or female neutering or both, and/or other common incision sites. Alternatively, web 102 may be made, in whole or in part, of such a material such that web 102 may itself comprise a dressing.

FIGS. 8 to 23 show a reversible wearable animal incision cover 100 comprising,
a web 102 having a longitudinal axis 104 for alignment along a bottom of a length of an animal 106 the web 102 having four leg apertures 108 in the bottom 109 of the web 102 for four legs of the animal 106. Web 102 has one or more connector for operably connecting opposing sides 111 of web 102 to draw opposing side edges 112 of web 102 towards each other over a back 114 of the animal 106. Web 102 also has a first end 116 at an end of the longitudinal axis 104, the first end 116 comprising a female rear body covering portion 118 for placement over a rear of a female animal 119, and web 102 having a second end 120 at another end of the longitudinal axis 104, the second end 120 comprising a male rear body covering portion 122 for placement over a rear of a male animal 154.

Leg apertures 108 comprise female animal rear leg apertures 126 at the first end 116 of web 102 and male animal rear leg apertures 140 at the second end 120 of web 102.

The female rear body covering portion 118 defines female urinary channel 124 for permitting unobstructed female urinary function through the female urinary channel 124, which female urinary channel 124 may comprise "V"-shaped female urinary channel 130.

Female urinary channel 124/130 commences substantially between the female animal rear leg apertures 126 and may commence at a vertex 128. Female urinary channel 124/130 extends rearwardly and upwardly and may be in a substantially "V" shaped pattern for substantially avoiding a female animal genital area 132 required for urination.

Male rear body covering portion 122 extends rearwardly and upwardly for covering the testicles 136 or an area where testicles 136 were previously joined to the body of the male animal 106 before being removed.

Male rear body covering portion 122 comprises a rear edge 138 of second 120 of the web 102, the rear edge 138 transverse to the longitudinal axis 104, the rear edge 138 located rearwardly of the male animal rear leg apertures 140.

Rear edge 138 comprises a drawstring channel 142 with a drawstring 144 disposed within the drawstring channel 142, the drawstring 144 for drawing the male rear body covering portion 122 upwardly against the rear of the male animal 154 and drawing the rear side edges 146 of the web 102 towards each other. Rear side edges 146 of web 102 generally comprise that portion of side edges 112 from loop 148 to drawstring channel 142.

Each side edge 112 of the web 102 may comprise a loop 148 forward of the rear edge 138 of second end 120 of web 102, each loop 148 for receiving a different end 150 of the drawstring 144, the ends 150 of the drawstring 144 being configured to be connectable to each other for drawing male rear body covering portion 122 forwardly and upwardly against the rear of the male animal 106. Ends 150 of drawstring 144 are typically connected by tying ends 150 together, but ends 150 may be connected with any other known prior art fastener, including Velcro, snaps, hooks, buttons or the like. Loops 148 assist in thawing male rear body covering portion 122 and/or rear panel 152 more snugly against the rear of male animal 154 to prevent or reduce gaps 64 between male animal 106 and male rear body covering portion 122 and/or rear panel 152.

Each rear side edge 146 of web 102 comprises a notch 151 between the loop 148 and the drawstring channel 142, each notch 151 extending inwardly from each corresponding rear side edge 146 of the web 102, the notches 151 defining a rear panel 152 of the male rear body covering portion 122, the rear panel 152 for being drawn forwardly and upwardly against the rear of the male animal 154. Ends 150 of the drawstring 144 are connectable to each other forward of the juncture between the tail and the body 156 of the male animal 106. Ends 150 of the drawstring 144 are connectable to each other for preventing the drawstring 144 from slipping rearwardly past the juncture between the tail and the body 156 of the male animal 106.

Male rear body covering portion 122 extends rearwardly and upwardly for covering testicles 136 of a male animal 106 or an area where the testicles 136 were previously joined to a body of the male animal 106 before being removed.

Drawstring channel 142 is rearward of the male animal rear leg apertures 140 and drawstring channel 142 may be substantially perpendicular to the longitudinal axis 104 of web 102.

Bottom of the web 102 may further comprise a selection area 158 substantially along the longitudinal axis 104, the selection area 158 comprising a plurality of longitudinally arranged openable penis apertures 160 separated by reinforcements 162. The selection area 158 may run forwardly from the drawstring channel 142. Openable penis apertures 160 may be opened by removing releasable stitching 164. However openable penis apertures may be held closed by other means and openable penis apertures 160 may be separated by reinforcements 162 other than releasable stitching 164 in order to prevent the opening of one openable penis aperture 160 from causing another openable penis aperture 160 from opening. Reinforcements 162 comprise releasable stitching 164 transverse to the longitudinal axis 104 of web 102. Each openable penis aperture 160 may be adjacent to another openable penis aperture 160.

PARTS LIST

50. Prior art female animal incision cover
52. Prior art male animal incision cover
54. Female rear access area
56. Male rear coverage area
58. Prior art ties (5 pair)
60. Prior art rear ties (1 pair)
62. Leg apertures (4)
64. Gaps in male rear coverage area
66. Prior art penis aperture (fixed location)
100. Reversible wearable animal incision cover
102. Web
104. Longitudinal axis (of web)
106. Animal (model dog)
108. Leg apertures (4)
109. Bottom of web
110. Ties
111. Sides of web
112. Side edges (of web)
114. Back (of animal—dog)
116. First end (of web for female dogs)
118. Female rear body covering portion
119. Rear of female animal
120. Second end (of web for male dogs)
122. Male rear body covering portion
124. Female urinary channel
126. Female animal rear leg apertures (2)
128. Vertex
130. "V" shaped female urinary channel
132. Female animal genital area
134. Area attaching testicles to body
136. Testicles (not shown)
138. Rear edge (of second end of web)
140. Male animal rear leg apertures (2)
142. Drawstring channel
144. Drawstring
146. Rear side edges (of web)
148. Loop
150. Ends of drawstring
151. Notch
152. Rear panel (of web)
154. Rear of male animal
156. Juncture between tail and body (of animal—dog)
158. Selection area
160. Openable penis apertures
162. Reinforcements (between openable penis apertures)
164. Releasable Stitching

I claim:

1. A reversible wearable animal incision cover comprising,
a web having a longitudinal axis for alignment along a bottom of a length of an animal, the web having four leg apertures in a bottom of the web for four legs of the animal, the web having one or more connector for operably connecting opposing sides of the web towards to draw opposing side edges of the web towards each other over a back of the animal, the web having a first end at an end of the longitudinal axis, the first end comprising
a female rear body covering portion for placement over a rear of a female animal, wherein the female rear body covering portion defines a female urinary channel for permitting unobstructed female urinary function through the female urinary channel, wherein the female urinary channel commences substantially between a female animal rear leg apertures and
the web having a second end at another end of the longitudinal axis, the second end comprising
a male rear body covering portion for placement over a rear of a male animal, wherein the male rear body covering portion extends rearwardly and upwardly for covering testicles of a male animal or an area where the testicles were previously joined to a body of the male animal before being removed;
wherein the bottom of the web further comprises a selection area substantially along the longitudinal axis, the selection area comprising a plurality of longitudinally arranged openable penis apertures separated by reinforcements.

2. The cover of claim 1 wherein the female urinary channel commences substantially between the female animal rear leg apertures at a vertex and the female urinary channel extends rearwardly and upwardly in a substantially "V" shaped pattern for substantially avoiding a female animal genital area.

3. The cover of claim 1 wherein the male rear body covering portion comprises a rear edge of the web, the rear edge transverse to the longitudinal axis, the rear edge located rearwardly of
the male animal rear leg apertures.

4. The cover of claim 3 wherein the rear edge comprises a drawstring channel with a
drawstring disposed within the drawstring channel, the drawstring for drawing the male rear body covering portion upwardly against the rear of the male animal and drawing the rear side edges of the web towards each other.

5. The cover of claim 4 wherein each side edge of the web comprises a loop forward of
the rear edge of the web, each loop for receiving a different end of the drawstring, the ends of the drawstring being configured to be connectable to each other for drawing the male rear body covering portion forwardly and upwardly against the rear of the male animal.

6. The cover of claim 5 wherein each rear side of the web comprises a notch between the loop and the drawstring channel, each notch extending inwardly from each corresponding rear side edge of the web, the notches defining a rear panel of the male rear body covering portion, the rear panel for being drawn forwardly and upwardly against the rear of the male animal.

7. The cover of claim 6 wherein the ends of the drawstring are connectable to each other forward of a juncture between the tail and the body of the male animal.

8. The cover of claim 7 wherein the ends of the drawstring are connectable to each other for
preventing the drawstring from slipping rearwardly past the juncture between the tail and the body of the male animal.

9. The cover of claim 4 wherein the drawstring channel is rearward of the male animal rear leg apertures.

10. The cover of claim 9 wherein the drawstring channel is substantially perpendicular to the longitudinal axis.

11. The cover of claim 1 wherein the selection area runs forwardly from the drawstring channel.

12. The cover of claim 1 wherein the openable penis apertures are opened by removing releasable stitching.

13. The cover of claim 1 wherein the reinforcements comprise stitching transverse to the longitudinal axis.

14. The cover of claim 1 wherein each openable penis aperture is adjacent to another openable penis aperture.

* * * * *